(12) United States Patent
Oda et al.

(10) Patent No.: US 12,400,462 B2
(45) Date of Patent: Aug. 26, 2025

(54) METHODS AND APPARATUS TO ANALYZE AN IMAGE OF A PORTION OF AN ITEM FOR A PATTERNINDICATING AUTHENTICITY OF THE ITEM

(71) Applicant: Collectors Universe, Inc., Santa Ana, CA (US)

(72) Inventors: Hideto Oda, Tokyo (JP); Dan Van Tran, Bedminster, NJ (US)

(73) Assignee: Collectors Universe, Inc., Santa Ana, CA (US)

( * ) Notice: Subject to any disclaimer, the term of this patent is extended or adjusted under 35 U.S.C. 154(b) by 0 days.

(21) Appl. No.: 18/904,505

(22) Filed: Oct. 2, 2024

(65) Prior Publication Data

US 2025/0111685 A1    Apr. 3, 2025

Related U.S. Application Data

(60) Provisional application No. 63/587,280, filed on Oct. 2, 2023.

(51) Int. Cl.
*G06V 20/00* (2022.01)
*G06V 10/50* (2022.01)
(Continued)

(52) U.S. Cl.
CPC ............. *G06V 20/95* (2022.01); *G06V 10/50* (2022.01); *G06V 10/7715* (2022.01); *G06V 10/774* (2022.01); *G06V 10/993* (2022.01)

(58) Field of Classification Search
None
See application file for complete search history.

(56) References Cited

U.S. PATENT DOCUMENTS 4,899,392 A     2/1990   Merton
5,133,019 A     7/1992   Merton et al.
(Continued)

FOREIGN PATENT DOCUMENTS

KR    20130061567 A     6/2013
WO    WO-2015080669 A1  6/2015
(Continued)

OTHER PUBLICATIONS

Alake, R., "Deep Learning: Understanding The Inception Module," Towards Data Science, Published on Dec. 22, 2020. Retrieved online from https://towardsdatascience.com/deep-learning-understand-the-inception-module-56146866e652, [retrieved on May 17, 2022]; 13 pages.

(Continued)

*Primary Examiner* — Sean M Conner
(74) *Attorney, Agent, or Firm* — COOLEY LLP

(57) ABSTRACT

In an embodiment, a method includes receiving a plurality of images having a plurality of image types. The method further includes, for each image type from the plurality of image types and to generate a plurality of subsets of images, identifying a subset of images from the plurality of images being that image type using an image classifier. The method further includes, for each subset of images from the plurality of subsets of images, performing feature extraction on each image from that subset of images to generate features associated with that image. The method further includes inputting the features associated with each image from that subset of images to a trained ML model from a plurality of trained ML models to generate an output indicating whether a collectible associated with that image is authentic or counterfeit.

18 Claims, 11 Drawing Sheets

(51) Int. Cl.
*G06V 10/77* (2022.01)
*G06V 10/774* (2022.01)
*G06V 10/98* (2022.01)

(56) References Cited

U.S. PATENT DOCUMENTS

| | | | |
|---|---|---|---|
| 5,220,614 | A | 6/1993 | Crain |
| 5,224,176 | A | 6/1993 | Crain |
| 6,239,867 | B1 | 5/2001 | Aggarwal |
| 6,295,750 | B1 | 10/2001 | Harwell et al. |
| 6,726,205 | B1 | 4/2004 | Purton |
| 7,119,689 | B2 | 10/2006 | Mallett et al. |
| 7,660,468 | B2 | 2/2010 | Gokturk et al. |
| 8,234,185 | B2 | 7/2012 | Davis |
| 8,626,600 | B2 | 1/2014 | Yankovich et al. |
| 8,977,603 | B2 | 3/2015 | Pate et al. |
| 9,050,719 | B2 | 6/2015 | Valpola et al. |
| 9,443,298 | B2 | 9/2016 | Ross et al. |
| 9,538,149 | B2 | 1/2017 | Williams et al. |
| 9,672,551 | B2 | 6/2017 | Pate et al. |
| 9,679,319 | B2 | 6/2017 | Yankovich et al. |
| 9,767,163 | B2 | 9/2017 | Kass et al. |
| 10,104,197 | B2 | 10/2018 | Williams et al. |
| 10,146,841 | B2 | 12/2018 | Kass et al. |
| 10,229,445 | B2 | 3/2019 | Pate et al. |
| 10,360,531 | B1 | 7/2019 | Stallman et al. |
| 10,445,330 | B2 | 10/2019 | Kass et al. |
| 10,459,931 | B2 | 10/2019 | Kass et al. |
| 10,470,740 | B2 | 11/2019 | Freudenberger et al. |
| 10,500,735 | B1 | 12/2019 | Menon et al. |
| 10,525,599 | B1 | 1/2020 | Zutshi |
| 10,529,137 | B1 * | 1/2020 | Black ............... G06T 15/04 |
| 10,561,469 | B2 | 2/2020 | Kasai et al. |
| 10,630,805 | B2 | 4/2020 | Williams et al. |
| 10,753,882 | B1 | 8/2020 | Mahajan et al. |
| 10,942,933 | B2 | 3/2021 | Kass et al. |
| 12,141,817 | B2 | 11/2024 | Frisbee et al. |
| 12,159,393 | B2 | 12/2024 | Shalamberidze et al. |
| 2005/0197853 | A1 | 9/2005 | Ueno |
| 2007/0187266 | A1 | 8/2007 | Porter et al. |
| 2007/0279494 | A1 | 12/2007 | Aman et al. |
| 2008/0023343 | A1 | 1/2008 | Macor |
| 2008/0023351 | A1 | 1/2008 | Macor |
| 2010/0088168 | A1 | 4/2010 | Sullivan et al. |
| 2014/0083243 | A1 | 3/2014 | Morrow |
| 2014/0279527 | A1 | 9/2014 | Duke et al. |
| 2015/0117701 | A1 | 4/2015 | Ross et al. |
| 2016/0210734 | A1 | 7/2016 | Kass et al. |
| 2017/0032285 | A1 | 2/2017 | Sharma et al. |
| 2017/0308744 | A1* | 10/2017 | Gaubatz ............... G07D 7/1205 |
| 2017/0343481 | A1 | 11/2017 | Jahanshahi et al. |
| 2018/0268378 | A1 | 9/2018 | Liu et al. |
| 2019/0130560 | A1 | 5/2019 | Horowitz et al. |
| 2019/0205959 | A1 | 7/2019 | Pate et al. |
| 2019/0392457 | A1 | 12/2019 | Kuntagod et al. |
| 2020/0082522 | A1 | 3/2020 | Bonneau et al. |
| 2020/0193666 | A1 | 6/2020 | Cinnamon et al. |
| 2020/0193866 | A1 | 6/2020 | Kubota et al. |
| 2021/0042797 | A1 | 2/2021 | Shamiss et al. |
| 2021/0065353 | A1 | 3/2021 | Potter et al. |
| 2021/0158274 | A1 | 5/2021 | Patchen |
| 2021/0201039 | A1 | 7/2021 | Frei et al. |
| 2021/0304559 | A1 | 9/2021 | Cupersmith et al. |
| 2022/0012446 | A1 | 1/2022 | Dolmayan |
| 2022/0036371 | A1 | 2/2022 | Frisbee et al. |
| 2022/0092609 | A1* | 3/2022 | Giera .................. G06V 10/82 |
| 2022/0261984 | A1 | 8/2022 | Shalamberidze et al. |
| 2022/0343483 | A1 | 10/2022 | Desai |
| 2022/0374946 | A1 | 11/2022 | Kass et al. |
| 2023/0191823 | A1* | 6/2023 | Hsu ..................... B42D 25/30 382/103 |
| 2023/0252532 | A1 | 8/2023 | Isakov et al. |
| 2024/0005688 | A1* | 1/2024 | Douglas ............... G06V 20/95 |
| 2024/0037385 | A1* | 2/2024 | Torabi .................. G16H 50/20 |
| 2024/0066910 | A1 | 2/2024 | Kass et al. |

FOREIGN PATENT DOCUMENTS

| | | |
|---|---|---|
| WO | WO-2022026924 A1 | 2/2022 |
| WO | WO-2022178270 A1 | 8/2022 |

OTHER PUBLICATIONS

Author Unknown, " CoinManage 2006: Getting Started Guide," Liberty Street Software, 2006; 53 pages.
Author Unknown, "2012 Topps Classic Walk-Offs, Professional Sports Authenticator," Sep. 15, 2015, Retrieved online from https://web.archive.org/web/20150915013815/http:/www.psacard.com/Pop/Detail.aspx?c=102355; 1 page.
Author Unknown, "Computerized Grading?" User RNICK on Apr. 22, 2004, in Trading Cards & Memorabilia Forum, Collectors Universe, Retrieved online from https://forums.collectors.com/discussion/comment/2670306/#Comment_2670306, [retrieved on Sep. 7, 2023]; 7 pages.
Author Unknown, "Diamonds. The 4 C's of a diamond," Goldsmith Jewelers, Jan. 10, 2007, Retrieved online from https://web.archive.org/web/20070110234016/http:/www.goldsmithlf.com/Diamonds.html; 1 page.
Author Unknown, "Gemology 101," Mardon Jewelers: at the Mission Inn, Oct. 13, 2010, Retrieved online from https://web.archive.org/web/20101013162932/https:/www.mardonjewelers.com/gemstones/gemology-101.php; 1 page.
Author Unknown "Imagenet Overview," 2016, Stanford Vision Lab, Stanford University, Princeton University, https://web.archive.org/web/20210125211537/http://image-net.org/about-overview; 1 page.
Author Unknown, "PCGS: Reconsideration. You asked for it and PCGS delivered." Professional Coin Grading Service, Oct. 31, 2013, Retrieved online from https://web.archive.org/web/20131031073907/https:/www.pcgs.com/reconsideration; 1 page.
Author Unknown, "Population Report, Professional Sports Authenticator," Feb. 10, 2013, Retrieved online from https://web.archive.org/web/20130210162234/http:/www.psacard.com/POP/Default.aspx; 1 page.
Author Unknown, "Population Report, Professional Sports Authenticator," Feb. 18, 2013, Retrieved online from https://web.archive.org/web/20130218141125/http:/www.psacard.com/pop/SubCategory.aspx?c=20003; 3 pages.
Author Unknown, "PSA Offers Easy Way to Sell Set Registry Cards via Collectors Corner," Professional Sports Authenticator. Published on May 15, 2014. Retrieved online from https://www.psacard.com/articles/articleview/8178/psa-offers-easy-way-sell-set-registry-cards-via-collectors-corner, [retrieved on Mar. 21, 2024]; 2 pages.
Author Unknown "PSA Security: A Buyer's Guide, " Professional Sports Authenticator, Dec. 3, 2014, Retrieved online from https://web.archive.org/web/20141203050146/https:/www.psacard.com/services/psasecurityabuyersguide, [retrieved on Aug. 2, 2024]; 2 pages.
Author Unknown "The World's FIRST Online Grading Service," Online Grading Services, LLC, Dec. 1, 2002, Retrieved online from https://web.archive.org/web/20021201042357/ http://www.ogscard.com:80/, [retrieved on Sep. 14, 2023]; 1 page.
Author Unknown, "Vehicle Identification Number (VIN) OCR," Klippa. Retrieved online from https://www.klippa.com/en/ocr/datafields/vins/, [retrieved on Feb. 5, 2025]; 6 pages.
Author Unknown "Welcome to the CTA Grading Experts Website," CTA Grading Experts, Feb. 3, 2006, Retrieved online from https://web.archive.org/web/20060203013241/ http:/ctagradingexperts.com/, [retrieved on Sep. 25, 2023]; 1 page.
Author Unknown, "What Is VVS Diamond Clarity and When Should You Choose It?" Jewelry Notes, Jan. 17, 2013, Retrieved online from https://web.archive.org/web/20130117024849/https:/www.jewelrynotes.com/what-is-vvs-diamond-clarity-and-when-should-you-choose-it/; 5 pages.
Author Unknown "Your Grading Company for the new Millennium," CTA Grading Experts, Feb. 13, 2006, Retrieved online from https://web.archive.org/web/20060213014751/http://www.ctagradingexperts.com/ctaflash.html, [retrieved on Sep. 25, 2023]; 3 pages.

(56) References Cited

OTHER PUBLICATIONS

Bassett, R. A., "Machine Assisted Grading of Rare Collectibles through the COINS framework". Dissertation, School of Computer Science and Information Systems, Pace University, Jul. 24, 2003; 194 pages.

Bassett, R. A., "Machine assisted visual grading of rare collectibles over the Internet," Western Connecticut State University, 2003; 12 pages.

Berenguel, A., et al., "Evaluation of Texture Descriptors for Validation of Counterfeit Documents," 2017 14th IAPR International Conference on Document Analysis and Recognition (ICDAR), Jan. 29, 2018, pp. 1237-1242.

Crisp, S., "How to Grade a Baseball Card: Everything You Ever Wanted To Know," Ultimate Team Set, Mar. 2, 2015, http://ultimateteamset.com/howtogradeabaseballcard.html, [retrieved online on Sep. 7, 2023], and https://web.archive.org/web/*/http://ultimateteamset.com/howtogradeabaseballcard.html*, [retrieved on Sep. 27, 2023]; 14 pages.

Cui, Y., et al., "A Survey on Unsupervised Anomaly Detection Algorithms for Industrial Images," IEEE Access, Jun. 5, 2023, vol. 11, pp. 55297-55315.

European Search Report and Written Opinion, EP Application No. 21848631.4, by Collectors Universe, Inc., mailed Jul. 8, 2024; 12 pages.

Extended European Search Report for European Application No. 22757010.8, by Collectors Universe, Inc., mailed Dec. 3, 2024; 10 pages.

Feng, V., "An Overview of ResNet and its Variants". Towards Data Science, Jul. 15, 2017, https://towardsdatascience.com/an-overview-of-resnet-and-its-variants-5281e2f56035; 18 pages.

Ghanmi, N., et al., "A New Descriptor for Pattern Matching: Application to Identity Document Verification," 2018 13th IAPR International Workshop on Document Analysis Systems (DAS), Jun. 25, 2018, pp. 375-380.

Halperin, J., "Computer Grading". CoinGrading.com (1999); https://coingrading.com/compgrade1.html, [retrieved on Jul. 20, 2023]; 2 pages.

He, K. et al., "Deep Residual Learning for Image Recognition". arXiv:1512.03385, Dec. 10, 2015; 12 pages.

Huang, S-Y., et al., "Recent Advances in Counterfeit Art, Document, Photo, Hologram, and Currency Detection Using Hyperspectral Imaging," Sensors, Sep. 26, 2022, 22(19):7308; 18 pages.

International Preliminary Report on Patentability for International Application No. PCT/US2022/017010, by Collectors Universe, Inc., mailed Aug. 31, 2023; 9 pages.

International Search Report and Written Opinion for International Application No. PCT/US2022/017010, by Collectors Universe, Inc., mailed Jun. 10, 2022; 10 pages.

International Search Report and Written Opinion for PCT Application No. PCT/US2024/049604, by Collectors Universe, Inc., mailed Jan. 20, 2025; 25 pages.

Lagerstrom, et al., "Objective Image Based Grading of Opal Gemstones". The 2010 International Conference on Image Processing, Computer Vision, and Pattern Recognition, Las Vegas, Nevada, USA, Jul. 12-15, 2010, https://publications.csiro.au/publications/publication/PIcsiro:EP101733, [retrieved on Jul. 20, 2023]; 2 pages.

Liu, L., et al., "Document image classification: Progress over two decades," Neurocomputing, [Epub May 4, 2021]; Sep. 17, 2021, vol. 453, pp. 223-240.

Müller, M., et al., "Classification of Bainitic Structures Using Textural Parameters and Machine Learning Techniques," Metals, May 12, 2020, 10(5): 630, pp. 1-19.

Nepal, P., "VGGNet Architecture Explained," Analytics Vidhya, Published on Jul. 30, 2020. Retrieved online from https://medium.com/analytics-vidhya/vggnet-architecture-explained-e5c7318aa5b6#; 5 pages.

Non-Final Office Action for U.S. Appl. No. 17/674,328, by Shalamberidze et al., mailed Mar. 20, 2024; 8 pages.

Notice of Allowance for U.S. Appl. No. 17/674,328, by Shalamberidze et al., mailed Aug. 14, 2024; 2 pages.

Notice of Allowance for U.S. Appl. No. 17/674,328, by Shalamberidze et al., mailed Jul. 31, 2024; 10 pages.

Ruheena, B. F., et al., "Fake Currency Detection using Deep Learning Technique," International Journal of Engineering Research & Technology (IJERT), RTCSIT—2022 Conference Proceedings, 2022, vol. 10, Issue 12, pp. 85-87.

Simonyan, K., et al., "Very Deep Convolutional Networks for Large-Scale Image Recognition," arXiv preprint arXiv:1409.1556, Apr. 10, 2015; 14 pages.

Sruthy, R., "A review of Fake Currency Recognition Methods," International Research Journal of Engineering and Technology (IRJET), Jul. 2022, vol. 9, Issue 7, pp. 2633-2636.

Timmer, J., "Computer algorithm can accurately identify Jackson Pollock paintings," ARS Technica, published on Feb. 12, 2015 [online]. Retrieved from https://web.archive.org/web/20230602195424/https://arstechnica.com/science/2015/02/computer-algorithm-can-accurately-identify-jackson-pollock-paintings/, [retrieved on Jan. 8, 2025]; 4 pages.

U.S. Currency Education Program, "$1 Note: Issued 1963-Present," Federal Reserve Board, first publication date unknown [online]. Retrieved from https://www.uscurrency.gov/sites/default/files/downloadable-materials/files/en/1-1963-present-features-en.pdf, [retrieved on Jan. 8, 2025]; 1 page.

U.S. Currency Education Program, "$10 Note: Issued 1914-1990," Federal Reserve Board, first publication date unknown [online]. Retrieved from https://www.uscurrency.gov/sites/default/files/downloadable-materials/files/en/10-1914-1990-features-en.pdf, [retrieved on Jan. 8, 2025]; 1 page.

U.S. Currency Education Program, "$10 Note: Issued 1990-2000," Federal Reserve Board, first publication date unknown [online]. Retrieved from https://www.uscurrency.gov/sites/default/files/downloadable-materials/files/en/10-1990-2000-features-en.pdf, [retrieved on Jan. 8, 2025]; 1 page.

U.S. Currency Education Program, "$10 Note: Issued 2000-2006," Federal Reserve Board, first publication date unknown [online]. Retrieved from https://www.uscurrency.gov/sites/default/files/downloadable-materials/files/en/10-2000-2006-features-en.pdf, [retrieved on Jan. 8, 2025]; 1 page.

U.S. Currency Education Program, "$10 Note: Issued 2006-Present," Federal Reserve Board, first publication date unknown [online]. Retrieved from https://www.uscurrency.gov/sites/default/files/downloadable-materials/files/en/10-2006-present-features-en.pdf, [retrieved on Jan. 8, 2025]; 1 page.

U.S. Currency Education Program, "$100 Note: Issued 1914-1990," Federal Reserve Board, first publication date unknown [online]. Retrieved from https://www.uscurrency.gov/sites/default/files/downloadable-materials/files/en/100-1914-1990-features-en.pdf, [retrieved on Jan. 8, 2025]; 1 page.

U.S. Currency Education Program, "$100 Note: Issued 1990-1996," Federal Reserve Board, first publication date unknown [online]. Retrieved from https://www.uscurrency.gov/sites/default/files/downloadable-materials/files/en/100-1990-1996-features-en.pdf, [retrieved on Jan. 8, 2025]; 1 page.

U.S. Currency Education Program, "$100 Note: Issued 1996-2013," Federal Reserve Board, first publication date unknown [online]. Retrieved from https://www.uscurrency.gov/sites/default/files/downloadable-materials/files/en/100-1996-2013-features-en.pdf, [retrieved on Jan. 8, 2025]; 1 page.

U.S. Currency Education Program, "$100 Note: Issued 2013-Present," Federal Reserve Board, first publication date unknown [online]. Retrieved from https://www.uscurrency.gov/sites/default/files/downloadable-materials/files/en/100-2013-present-features-en.pdf, [retrieved on Jan. 8, 2025]; 1 page.

U.S. Currency Education Program, "$2 Note: Issued 1976-Present," Federal Reserve Board, first publication date unknown [online]. Retrieved from https://www.uscurrency.gov/sites/default/files/downloadable-materials/files/en/2-1976-present-features-en.pdf, [retrieved on Jan. 8, 2025]; 1 page.

U.S. Currency Education Program, "$20 Note: Issued 1914-1990," Federal Reserve Board, first publication date unknown [online]. Retrieved from https://www.uscurrency.gov/sites/default/files/downloadable-materials/files/en/20-1914-1990-features-en.pdf, [retrieved on Jan. 8, 2025]; 1 page.

(56) References Cited

OTHER PUBLICATIONS

U.S. Currency Education Program, "$20 Note: Issued 1990-1998," Federal Reserve Board, first publication date unknown [online]. Retrieved from https://www.uscurrency.gov/sites/default/files/downloadable-materials/files/en/20-1990-1998-features-en.pdf, [retrieved on Jan. 8, 2025]; 1 page.

U.S. Currency Education Program, "$20 Note: Issued 1998-2003," Federal Reserve Board, first publication date unknown [online]. Retrieved from https://www.uscurrency.gov/sites/default/files/downloadable-materials/files/en/20-1998-2003-features-en.pdf, [retrieved on Jan. 8, 2025]; 1 page.

U.S. Currency Education Program, "$20 Note: Issued 2003-Present," Federal Reserve Board, first publication date unknown [online]. Retrieved from https://www.uscurrency.gov/sites/default/files/downloadable-materials/files/en/20-2003-present-features-en.pdf, [retrieved on Jan. 8, 2025]; 1 page.

U.S. Currency Education Program, "$5 Note: Issued 1914-1993," Federal Reserve Board, first publication date unknown [online]. Retrieved from https://www.uscurrency.gov/sites/default/files/downloadable-materials/files/en/5-1914-1993-features-en.pdf, [retrieved on Jan. 8, 2025]; 1 page.

U.S. Currency Education Program, "$5 Note: Issued 1993-2000," Federal Reserve Board, first publication date unknown [online]. Retrieved from https://www.uscurrency.gov/sites/default/files/downloadable-materials/files/en/5-1993-2000-features-en.pdf, [retrieved on Jan. 8, 2025]; 1 page.

U.S. Currency Education Program, "$5 Note: Issued 2000-2008," Federal Reserve Board, first publication date unknown [online]. Retrieved from https://www.uscurrency.gov/sites/default/files/downloadable-materials/files/en/5-2000-2008-features-en.pdf, [retrieved on Jan. 8, 2025]; 1 page.

U.S. Currency Education Program, "$5 Note: Issued 2008-Present," Federal Reserve Board, first publication date unknown [online]. Retrieved from https://www.uscurrency.gov/sites/default/files/downloadable-materials/files/en/5-2008-present-features-en-2022.pdf, [retrieved on Jan. 8, 2025]; 1 page.

U.S. Currency Education Program, "$50 Note: Issued 1914-1990," Federal Reserve Board, first publication date unknown [online]. Retrieved from https://www.uscurrency.gov/sites/default/files/downloadable-materials/files/en/50-1914-1990-features-en.pdf, [retrieved on Jan. 8, 2025]; 1 page.

U.S. Currency Education Program, "$50 Note: Issued 1990-1997," Federal Reserve Board, first publication date unknown [online]. Retrieved from https://www.uscurrency.gov/sites/default/files/downloadable-materials/files/en/50-1990-1997-features-en.pdf, [retrieved on Jan. 8, 2025]; 1 page.

U.S. Currency Education Program, "$50 Note: Issued 1997-2004," Federal Reserve Board, first publication date unknown [online]. Retrieved from https://www.uscurrency.gov/sites/default/files/downloadable-materials/files/en/50-1997-2004-features-en.pdf, [retrieved on Jan. 8, 2025]; 1 page.

U.S. Currency Education Program, "$50 Note: Issued 2004-Present," Federal Reserve Board, first publication date unknown [online]. Retrieved from https://www.uscurrency.gov/sites/default/files/downloadable-materials/files/en/50-2004-present-features-en.pdf, [retrieved on Jan. 8, 2025]; 1 page.

U.S. Currency Education Program, "Alexander Hamilton: Founding Father of the United States," Federal Reserve Board, 2018 [online]. Retrieved from https://www.uscurrency.gov/sites/default/files/downloadable-materials/files/en/hamilton-10-brochure-en.pdf, [retrieved on Jan. 13, 2025]; 6 pages.

U.S. Currency Education Program, "Alexander Hamilton: Founding Father of the United States," Federal Reserve Board, first publication date unknown [online]. Retrieved from https://www.uscurrency.gov/educational-materials/alexander-hamilton-10, [retrieved on Jan. 13, 2025]; 8 pages.

U.S. Currency Education Program, "Carnival Thrills and Dollar Bills: A book about U.S. currency," Federal Reserve Board, first publication date unknown [online]. Retrieved from https://www.uscurrency.gov/educational-materials/classrooms/carnival-thrills-and-dollar-bills, [retrieved on Jan. 13, 2025]; 3 pages.

U.S. Currency Education Program, "Cashier Toolkit: A Guide to Identifying Genuine Currency," Federal Reserve Board, 2021 [online]. Retrieved from https://www.uscurrency.gov/sites/default/files/downloadable-materials/files/en/CEP_Cashier_Toolkit_2023.pdf, [retrieved on Jan. 8, 2025]; 10 pages.

U.S. Currency Education Program, "Cashier Toolkit: A Guide to Identifying Genuine Currency," Federal Reserve Board, first publication date unknown [online]. Retrieved from https://www.uscurrency.gov/cashier-toolkit, [retrieved on Jan. 8, 2025]; 7 pages.

U.S. Currency Education Program, "Decoding Dollars: The $100—A Brochure on $100 Note Security Features," Federal Reserve Board, 2021 [online]. Retrieved from https://www.uscurrency.gov/educational-materials/decoding-dollars-100, [retrieved on Jan. 8, 2025]; 10 pages.

U.S. Currency Education Program, "Decoding Dollars: The $100," Federal Reserve Board, 2024 [online]. Retrieved from https://www.uscurrency.gov/sites/default/files/downloadable-materials/files/en/decoding-dollars-100-brochure-and-poster-en.pdf, [retrieved on Jan. 8, 2025]; 9 pages.

U.S. Currency Education Program, "Decoding Dollars: The $20," Federal Reserve Board, 2024 [online]. Retrieved from https://www.uscurrency.gov/sites/default/files/downloadable-materials/files/en/decoding-dollars-20-brochure-and-poster-en.pdf, [retrieved on Jan. 8, 2025]; 9 pages.

U.S. Currency Education Program, "Dollars in Detail: Your Guide to U.S. Currency," Federal Reserve Board, 2024 [online]. Retrieved from https://www.uscurrency.gov/sites/default/files/downloadable-materials/files/en/dollars-in-detail-guide-en-2022.pdf, [retrieved on Jan. 8, 2025]; 10 pages.

U.S. Currency Education Program, "Download Materials: Download Free Materials About U.S. Currency in 24 Languages," Federal Reserve Board, first publication date unknown [online]. Retrieved from https://www.uscurrency.gov/educational-materials/download-materials, [retrieved on Dec. 2, 2024]; 21 pages.

U.S. Currency Education Program, "How to Check Your Money," Federal Reserve Board, first publication date unknown [online]. Retrieved from https://www.uscurrency.gov/sites/default/files/downloadable-materials/files/en/how-to-check-your-money-en.pdf, [retrieved on Jan. 8, 2025]; 41 pages.

U.S. Currency Education Program, "Know the $20," Federal Reserve Board, 2017 [online]. Retrieved from https://www.uscurrency.gov/sites/default/files/downloadable-materials/files/en/know-the-20-tent-en.pdf, [retrieved on Jan. 8, 2025]; 3 pages.

U.S. Currency Education Program, "Play Money Coloring Sheets," Federal Reserve Board, first publication date unknown [online]. Retrieved from https://www.uscurrency.gov/sites/default/files/downloadable-materials/files/en/play-money-coloring-sheets-en.pdf, [retrieved on Jan. 8, 2025]; 7 pages.

U.S. Currency Education Program, "Printable Play Money," Federal Reserve Board, first publication date unknown [online]. Retrieved from: https://www.uscurrency.gov/sites/default/files/downloadable-materials/files/en/printable-play-money-en.pdf, [retrieved on Jan. 8, 2025]; 1 page.

U.S. Currency Education Program, "Quick Reference Guide," Federal Reserve Board, 2024 [online]. Retrieved from https://www.uscurrency.gov/sites/default/files/downloadable-materials/files/en/quick-reference-guide-en-2022.pdf, [retrieved on Jan. 8, 2025]; 6 pages.

U.S. Currency Education Program, "Teller Toolkit: A Guide To Identifying Genuine Currency," Federal Reserve Board, 2021 [online]. Retrieved from: https://www.uscurrency.gov/sites/default/files/downloadable-materials/files/en/CEP_Teller_Toolkit_2023.pdf, [retrieved on Nov. 4, 2024]; 10 pages.

U.S. Currency Education Program, "Teller Toolkit: A Guide to Identifying Genuine Currency," Federal Reserve Board, first publication date unknown [online]. Retrieved from https://www.uscurrency.gov/teller-toolkit, [retrieved on Jan. 8, 2025]; 7 pages.

U.S. Currency Education Program, "The Latest in U.S. Currency Design," Multinote Booklet, Federal Reserve Board, Nov. 2016 [online]. Retrieved from https://www.uscurrency.gov/sites/default/

(56) References Cited

OTHER PUBLICATIONS files/downloadable-materials/files/en/multinote-booklet-en.pdf, [retrieved on Jan. 8, 2025]; 11 pages.

U.S. Currency Education Program, "The Latest in U.S. Currency Design," Multinote Poster, Federal Reserve Board, first publication date unknown [online]. Retrieved from https://www.uscurrency.gov/sites/default/files/downloadable-materials/files/en/multinote-poster-en.pdf, [retrieved on Jan. 8, 2025]; 1 page.

U.S. Currency Education Program, "The New $100 Note: Knows Its Features. Know It's Real," Brochure and Poster for $100 Note. Federal Reserve Board. Apr. 2010 [online]. Retrieved from https://www.uscurrency.gov/sites/default/files/downloadable-materials/files/en/brochure-and-poster-100-en.pdf, [retrieved on Jan. 8, 2025]; 4 pages.

U.S. Currency Education Program, "Tips to Spot Easy-to-Detect Counterfeit Notes," Federal Reserve Board, first publication date unknown [online]. Retrieved from https://www.uscurrency.gov/sites/default/files/downloadable-materials/files/en/quick-glance-reference-card-en-508.pdf, [retrieved on Jan. 8, 2025]; 1 page.

U.S. Department of Homeland Security: United States Secret Service, "Know Your Money," Apr. 2016 [online]. Retrieved from https://www.secretservice.gov/sites/default/files/reports/2020-12/KnowYourMoney.pdf, [retrieved on Nov. 4, 2024]; 3 pages.

Wikipedia, "Anomaly detection," published on Sep. 24, 2023. Retrieved from https://web.archive.org/web/20230924040833/https://en.wikipedia.org/wiki/Anomaly_detection, [retrieved on Feb. 5, 2025]; 2 pages.

Wikipedia, "Data augmentation," published on Sep. 18, 2023. Retrieved from https://web.archive.org/web/20230918152312/https://en.wikipedia.org/wiki/Data_augmentation, [retrieved on Feb. 5, 2025]; 1 page.

Wikipedia, "Histogram of oriented gradients," retrieved from https://en.wikipedia.org/wiki/Histogram_of_oriented_gradients, [retrieved on Oct. 11, 2024]; 7 pages.

Yang, J., et al., "Generalized Out-of-Distribution Detection: A Survey," Arxiv.org., Aug. 3, 2022, arXiv:2110.11334v2 [cs.CV]; 22 pages.

Notice of Reasons for Refusal for Japanese Application No. 2023-540512 mailed Apr. 30, 2025; 8 pages with English Translation.

\* cited by examiner

Receive a plurality of images having an image type, each image from the plurality of images including a predetermined portion 702

For each image from the plurality of images and to generate a plurality of sets of features associated with the plurality of images, perform feature extraction based on the predetermined portion of that image and not remaining portions of that image to generate a set of features associated with that image 704

Train, to generate a trained machine learning (ML) model, an ML model using the plurality of sets of features associated with the plurality of images 706

Receive an image (1) not included in the plurality of images, (2) that is the image type, and (3) has the predetermined portion 708

Perform feature extraction based on the predetermined portion of the image and not remaining portions of the image to generate a set of features associated with the image 710

Input the set of features associated with the image to the trained ML model to generate an output indicating an authenticity of a collectible associated with the image 712

```
┌─────────────────────────────────────────────────────────────────────────┐
│  Receive a plurality of images having a plurality of image types 802    │
└─────────────────────────────────────────────────────────────────────────┘
                                    ↓
┌─────────────────────────────────────────────────────────────────────────┐
│  For each image type from the plurality of image types and to generate  │
│  a plurality of subsets of cards, identify a subset of images from the  │
│  plurality of images being that image type using an image classifier 804│
└─────────────────────────────────────────────────────────────────────────┘
                                    ↓
┌─────────────────────────────────────────────────────────────────────────┐
│  For each subset of images from the plurality of subsets of images,     │
│  perform feature extraction on each image from that subset of images to │
│  generate features associated with that image 806                       │
└─────────────────────────────────────────────────────────────────────────┘
                                    ↓
┌─────────────────────────────────────────────────────────────────────────┐
│  For each subset of images from the plurality of subsets of images,     │
│  input the features associated with each image from that subset of      │
│  images to a trained ML model from a plurality of trained ML models to  │
│  generate an output indicating whether a collectible associated with    │
│  that image is authentic or counterfeit 808                             │
└─────────────────────────────────────────────────────────────────────────┘
```

Receive a representation of a plurality of cards being a card type, each card from the plurality of cards having a predetermined portion 902

For each card from the plurality of cards and to generate a plurality of sets of features associated with the plurality of cards, perform local binary pattern (LBP) feature extraction based on the predetermined portion of that card and not remaining portions of that card to generate a set of features associated with that card 904

Train, to generate a trained ML model, an ML model using the plurality of sets of features associated with the plurality of cards 906

FIG. 9

Receiving a plurality of images of a plurality of collectibles having a plurality of collectible types 1002

For each collectible type from the plurality of collectible types and to generate a plurality of subsets of images, identifying a subset of images from the plurality of images representing a collectible from the plurality of collectibles being that collectible type using an image classifier 1004

For each subset of images from the plurality of subsets of images, input a representation of each image from that subset of images, without performing feature extraction on that image, to a trained ML model from a plurality of trained ML models to generate an output indicating whether the collectible represented by that image is authentic or counterfeit 1006

METHODS AND APPARATUS TO ANALYZE AN IMAGE OF A PORTION OF AN ITEM FOR A PATTERNINDICATING AUTHENTICITY OF THE ITEM

CROSS REFERENCE TO RELATED APPLICATION

This application claims priority to U.S. Patent Application No. 63/587,280, filed Oct. 2, 2023 and titled "METHODS AND APPARATUS TO ANALYZE AN IMAGE OF A PORTION OF AN ITEM FOR A PATTERN INDICATING AUTHENTICITY OF THE ITEM," the contents of which are incorporated herein in its entirety.

FIELD

One or more embodiments are related to analyzing an image of a portion of an item for a pattern indicating authenticity of the item.

BACKGROUND

An item, such as a card, coin, figurine, comic book, painting, photograph, and/or the like can be a valuable and desirable asset. As such, using image analysis to quickly, accurately and efficiently determining whether the item is authentic or not can be desirable. Known authentication techniques, however, are slow, inaccurate, and inefficient.

SUMMARY

In an embodiment, a non-transitory, processor-readable medium stores instructions that, when executed by a processor, cause the processor to receive a plurality of images having an image type. Each image from the plurality of images includes a predetermined portion. The non-transitory, processor-readable medium further stores instructions that, when executed by the processor, cause the processor to, for each image from the plurality of images and to generate a plurality of sets of features associated with the plurality of images, perform feature extraction based on the predetermined portion of that image and not remaining portions of that image to generate a set of features associated with that image. The non-transitory, processor-readable medium further stores instructions that, when executed by the processor, cause the processor to train, to generate a trained machine learning (ML) model, an ML model using the plurality of sets of features associated with the plurality of images. The non-transitory, processor-readable medium further stores instructions that, when executed by the processor, cause the processor to receive an image (1) not included in the plurality of images, (2) that is the image type, and (3) has the predetermined portion. The non-transitory, processor-readable medium further stores instructions that, when executed by the processor, cause the processor to perform feature extraction based on the predetermined portion of the image and not remaining portions of the image to generate a set of features associated with the image. The non-transitory, processor-readable medium further stores instructions that, when executed by the processor, cause the processor to input the set of features associated with the image to the trained ML model to generate an output indicating an authenticity of the image.

In an embodiment, a method includes receiving a plurality of card images having a plurality of image types. The method further includes, for each image type from the plurality of image types and to generate a plurality of subsets of images, identifying a subset of images from the plurality of images being that image type using an image classifier. The method further includes, for each subset of images from the plurality of subsets of images, performing feature extraction on each image from that subset of images to generate features associated with that image. The method further includes inputting the features associated with each image from that subset of images to a trained ML model from a plurality of trained ML models to generate an output indicating whether a collectible associated with that image is authentic or counterfeit. Each trained ML model from the plurality of trained ML models is associated with an image type from the plurality of image types that is different for remaining trained ML models from the plurality of trained ML models.

In an embodiment, an apparatus includes a memory and a processor operatively coupled to the memory. The processor is configured to receive a plurality of images of a plurality of collectibles having a plurality of collectible types. The processor is further configured to, for each collectible type from the plurality of collectible types and to generate a plurality of subsets of images, identify a subset of images from the plurality of images representing a collectible from the plurality of collectibles being that collectible type using an image classifier. The processor is further configured to, for each subset of images from the plurality of subsets of images, input a representation of each image from that subset of images, without performing feature extraction on that image, to a trained ML model from a plurality of trained ML models to generate an output indicating whether the collectible represented by that image is authentic or counterfeit. Each trained ML model from the plurality of trained ML models is associated with a collectible type from the plurality of collectible types that is different for remaining trained ML models from the plurality of trained ML models. The plurality of trained ML models includes at least one of a deep auto encoder model, a deep nearest neighbor anomaly detection model, a semantic pyramid anomaly detection (SPADE) model, a patch distribution modeling framework for anomaly detection and segmentation (PaDiM) model, or an anomaly detection using patch-level features and core-set selection (PatchCore) model.

BRIEF DESCRIPTION OF THE DRAWINGS

FIG. 7 shows a flowchart of a method to train an ML model to produce an output indicating an authenticity of a collectible associated with an image, according to an embodiment.

FIG. 8 shows a flowchart of a method to determine whether collectibles associated with different images of different image types are authentic or counterfeit, according to an embodiment.

FIG. 9 shows a flowchart of a method to train a machine learning model using multiple images of authentic cards that are each a card type, according to an embodiment.

FIG. 10 shows a flowchart of a method to determine, without performing feature extraction, whether collectibles associated with different images of different image types are authentic or counterfeit, according to an embodiment.

DETAILED DESCRIPTION

Figure 1:
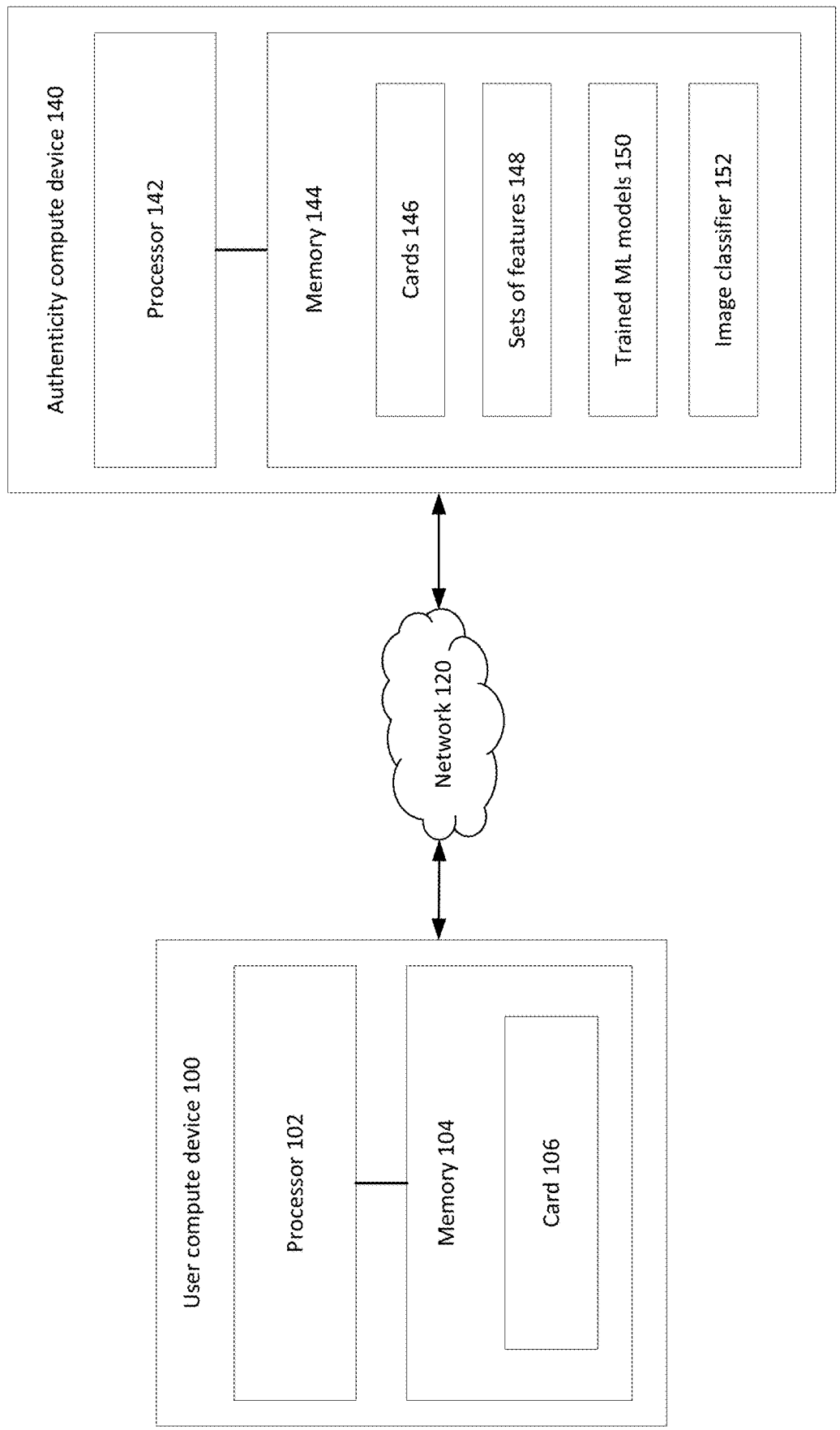
FIG. 1 shows a block diagram of a system to train and use ML models for determining card authenticity, according to an embodiment.

Some implementations are related to generating a training dataset by performing feature extraction using a predetermined portion of multiple cards (e.g., only authentic cards, only counterfeit cards, a combination of authentic cards and counterfeit cards, etc.) that each have the same card type. Thereafter, the training dataset can be used to train a machine learning (ML) model to produce an output indicating a card's authenticity. Upon completing training, the trained ML model can receive features not included in the training dataset and produce an output indicating an authenticity of the card from which the features not included in the training dataset were generated. In some implementations, different ML models can be trained using different sets of cards so that each ML model is configured to be trained using cards of a unique card type and configured to produce an output indicating whether a card is that unique card type.

As an example, feature extraction can be performed using the back side of multiple Magic: The Gathering cards. A first ML model can be trained using the extracted features. Where the Magic: The Gathering cards are all authentic, the first ML model can be trained via unsupervised learning. Where the Magic: The Gathering cards include some authentic Magic: The Gathering cards and some counterfeit Magic: The Gathering cards, the first ML model can be trained via supervised learning. Thereafter, features extracted from a different Magic: The Gathering card can be input into the first ML model, and the first ML model can produce an output indicating whether that different Magic: The Gathering card is authentic or inauthentic (e.g., a counterfeit). Additionally, continuing the example, feature extraction can be performed using an upper left region of multiple Yu-Gi-Oh! cards. A second ML model different than the first ML model can be trained using the extracted features. Where the Yu-Gi-Oh! cards are authentic, the second ML model can be trained via unsupervised learning. Where the Yu-Gi-Oh! cards include some authentic Yu-Gi-Oh! cards and some counterfeit Yu-Gi-Oh! cards, the second ML model can be trained via supervised learning. Thereafter, features extracted from a different Yu-Gi-Oh! card (e.g., an unknown) can be input into the second ML model, and the second ML model can produce an output indicating whether that different Yu-Gi-Oh! card is authentic or inauthentic (e.g., a counterfeit).

Some implementations are related to determining whether a collectible is authentic or counterfeit using a trained ML model and without performing feature extraction. For example, an image of a collectible can be preprocessed and input into a trained ML model without performing feature extraction before inputting. Said differently, feature extraction is not performed after the preprocessing and before inputting a preprocessed version of the image into the trained ML model. In response to receiving the input, the trained ML model generates an output indicating whether the collectible is authentic or counterfeit. In some implementations, the trained ML model is generated by training an ML model, via supervised learning, using a training dataset that includes images of authentic collectibles and images of counterfeit collectibles. In some implementations, the trained model is generated by training an ML model, via unsupervised learning, using a training dataset that includes images of authentic collectibles and not images of counterfeit collectibles. In some implementations, the trained model is generated by training an ML model using a training dataset that includes a non-synthetic image of a card and a synthetic image of a card; in some implementations, the non-synthetic image of the card is augmented to generate the synthetic image of the card (e.g., by augmenting a predetermined portion of the non-synthetic image and not remaining portions of the non-synthetic image).

Compared to known authentication techniques, techniques described herein can more quickly and accurately determine whether a card is authentic or inauthentic (e.g., a counterfeit). In some implementations, features can be extracted at a speed and level of detail unattainable by/not practical for a human. Accordingly, techniques described herein can be faster and more accurate than authentication performed by a human alone. Furthermore, techniques described herein determine authenticity of a card using a predetermined portion of the card. By analyzing certain portions of the card (e.g., the backside, a logo on the bottom right portion of the card, etc.) and not other portions of the card, fewer features are extracted; this can, among other benefits, save memory space, enable ML models to process less data, determine authenticity of the card faster, and more. Further, compared to some known techniques that are limited to determining authenticity of one type of collectible, techniques described herein can determine authenticity of multiple collectibles using a plurality of networks that includes an image classifier that can sort collectibles by type. Further, techniques described herein can be applied to cards/images of cards. Cards have characteristics, such as authentic cards of a particular card type share certain common features (e.g., a common backside design, a common marker at a corner, etc.) that techniques described herein exploit to determine authenticity; for example, some techniques described herein extract features from and/or augment (e.g., to generate additional training data) only those portions of cards/images of cards that are commonly shared across cards of that card type.

Although some implementations will be discussed herein in the context of cards, in some implementations, techniques discussed herein can be applied to various items and/or images of such items. For example, techniques discussed herein can be applied to coins, figurines, books, currency, hardware, apparel, video game cartridges, watches, shoes, paintings, photographs, and/or the like, and/or images thereof.

FIG. 1 shows a block diagram of a system to train and use ML models for determining card authenticity, according to an embodiment. FIG. 1 includes a user compute device 100 communicatively coupled to an authenticity compute device 140 via a network 120.

Network 120 can be any suitable communications network for transferring data, for example operating over public and/or private communications networks. For example, network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 120 can be a wireless network such as, for example, a Wi-Fi® or wireless local area network ("WLAN"), a wireless wide area network ("WWAN"), and/or a cellular network. In other instances, network 120 can be a wired network such as, for example, an Ethernet network, a digital subscription line ("DSL") network, a broadband network, and/or a fiber-optic network. In some instances, network 120 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via network 120 can be encrypted or unencrypted. In some instances, network 120 can include multiple networks or subnetworks operatively coupled to one another by, for example, network bridges, routers, switches, gateways and/or the like.

Authenticity compute device 140 includes a processor 142 operatively coupled to a memory 144 (e.g., via a system bus). Authenticity compute device 140 can be any type of compute device, such as a server, desktop, laptop, tablet, smartphone, and/or the like.

Processor 142 can be, for example, a hardware-based integrated circuit (IC) or any other suitable processing device configured to run and/or execute a set of instructions or code. For example, processor 142 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processor 142 can be configured to run and/or execute the methods and/or portions of methods discussed herein.

Memory 144 can be, for example, a random-access memory (RAM), a memory buffer, a hard drive, a read-only memory (ROM), an erasable programmable read-only memory (EPROM), and/or the like. Memory 144 can be configured to store data used by processor 142 to perform the techniques (methods, processes, etc.) discussed herein. In some instances, memory 144 can store, for example, one or more software programs and/or code that can include instructions to cause processor 142 to perform one or more processes, functions, and/or the like. In some implementations, memory 144 can include extendible storage units that can be added and used incrementally. In some implementations, memory 144 can be a portable memory (for example, a flash drive, a portable hard disk, a secure digital (SD) card, and/or the like) that can be operatively coupled to processor 142. In some instances, memory 144 can be remotely operatively coupled with a compute device (not shown in FIG. 1). In some instances, memory 144 is a virtual storage drive (e.g., RAMDisk), which can improve I/O speed and in turn, accelerate image reading and writing.

Memory 144 includes (e.g., stores) a representation (e.g., images) of cards 146. Cards 146 can be any type of card, such as a trading card. Cards 146 can include only authentic cards in some implementations, only counterfeit cards in other implementations, and a combination of authentic cards and counterfeit cards in other implementations. Each card from cards 146 can be a card type. For example, a first card from cards 146 can be a first card type, a second card from cards 146 can be a second card type, and so on. Examples of card types include, for example, different types, series and/or brands of trading cards. For example, the card types can include various collectible card games (CCG) or trading card games (TCG) such as, for example, Pokémon cards, Magic: The Gathering cards, Yu-Gi-Oh! cards, One Piece cards and/or the like, sport trading cards such as, for example, different types or brands of baseball cards, football cards, basketball cards, hockey cards and/or the like, and/or any other type or brand of collectable card.

In some implementations, authentic cards that are of a particular card type share at least one common identifier (e.g., the backsides are the same, a particular marker is located at a particular location, etc.); said differently, a card type can refer to a predetermined collection of cards that each include (or are claiming to include) a common predetermined portion. For example, the predetermined collection of cards can be Magic: The Gathering cards, and the predetermined portion can be the backside that is intended and/or manufactured to be common among authentic Magic: The Gathering cards. As another example, the predetermined collection of cards can be Yu-Gi-Oh! cards and the predetermined portion can be the upper left corner that is intended and/or manufactured to be common among authentic Yu-Gi-Oh! cards.

Memory 144 further includes (e.g., stores) a representation of sets of features 148. Sets of features 148 can be extracted from cards 146. Any suitable feature extraction technique can be used to generate sets of features 148 based on cards 146, such as, for example, feature extraction via local binary pattern (LBP), local ternary pattern (LTP), local phase quantization (LPQ), local derivative ternary pattern (LDTP), histogram of oriented gradients (HOG), gabor filters, local phase congruency (LPC), deep learning, local binary pattern histogram (LBPH) and/or the like. In some implementations, feature extraction includes performing feature extraction based on a predetermined portion of one or more images of cards from cards 146 and not other portions of the one or more images of the cards from 146. In some implementations, feature extraction includes performing feature extraction based on substantially all (e.g., at least 95%, at least 99%, 100%, and/or the like) portions of one or more images of cards from cards 146. In some implementations, generating sets of features 148 is not performed; said differently, set of features 148 is not generated and used to determine a card's authenticity.

Memory 144 further includes (e.g., stores) a representation of trained ML models 150. Trained ML models 150 can be/include any type of ML model(s), such as a one class support vector machine (SVM), an isolation forest model, a local outlier factor model, an autoencoder, a density-based model, a statistical-based model, a deep nearest neighbor anomaly detection model, a semantic pyramid anomaly detection (SPADE) model, a patch distribution modeling framework for anomaly detection and localization (PaDiM) model, an autoencoder, a towards total recall in industrial anomaly detection (PatchCore) model, a neural network model and/or the like. In some implementations, such as where cards 146 include only authentic cards or include only counterfeit cards, at least some models from trained ML models 150 can be trained using unsupervised learning (e.g., and not supervised learning). Additionally or alternatively, in some implementations, such as where cards 146 includes a combination of authentic cards and counterfeit cards, at least some models from trained ML models 150 can be trained using supervised learning (e.g., and not unsupervised learning). In some implementations, both unsupervised learning and supervised learning can be used to train trained ML models 150.

In some implementations, trained ML models 150 can be trained using sets of features 148. In some implementations, each ML model from trained ML models 150 can be trained using a subset of features from sets of features 148 that is associated with a different card type. For example, a first ML model from trained ML models 150 can be trained using a first subset of features from sets of features 148 that were extracted from a subset of authentic cards from cards 146 being a first card type, a second ML model from trained ML models 150 can be trained using a second subset of features from sets of features 148 that were extracted from a subset of authentic cards from cards 146 being a second card type, and so on.

In some implementations, where sets of features 148 is not used, trained ML models 150 can be trained, via supervised learning and without using sets of features 148, using a training dataset the includes images of authentic cards and images of counterfeit cards. In some implementations, where sets of features 148 is not used, trained ML models 150 can be trained, via unsupervised learning and without using sets of features 148, using a training dataset that includes images of authentic cards and not images of counterfeit cards.

In some implementations, trained ML models 150 are trained using a training dataset that includes non-synthetic images of a collectible and synthetic images of a collectible. For example, at least some of the non-synthetic images can be augmented to generate the synthetic images. In some implementations, where a trained ML model from trained ML models 150 is trained to determine authenticity for a particular card type, and authentic cards of that particular card type share a common identifier across authentic cards being that card type (e.g., common back, common marker design, common marker location etc.), that common identifier can be augmented to generate the synthetic image(s) (e.g., without augmenting other portions of the card or image). Augmenting the common identifier can include, for example, changing a color (e.g., to a different shade), changing text (e.g., introduce a typo, add a word, use a different font, change the text size, etc.), changing a location or orientation of an element of the common identifier, changing a pattern used in the common identifier, and/or the like. By augmenting and using synthetic images, a size and variety of the training dataset can increase and result in trained ML models 150 being more accurate, adaptable, and complete.

Upon completing training, trained ML models 150 can be configured to receive representations (e.g., images) of cards and produce an output indicating an authenticity of the cards. For example, the output can indicate that a card is authentic or counterfeit. As another example, the output can provide a value (e.g., score between 1 and 10) and/or percentage indicating the likelihood that a card is authentic (or counterfeit).

In some implementations, memory 144 further includes (e.g., stores) a representation of image classifier 152. Image classifier 152 can be any type of statistical model, such as an artificial intelligence (AI) or ML model. In some implementations, image classifier 152 is a histogram of oriented gradients feature model, a multi class support vector machine, a random forest, a neural network and/or the like. Image classifier 152 can be configured to (1) receive a representation of a card whose authenticity is to be determined and (2) determine the card type of the card so that the ML model(s) from trained ML models 150 trained to determine authenticity for cards of that card type can be selected and used to determine the authenticity of that card.

User compute device 100 includes a processor 102 operatively coupled to a memory 104 (e.g., via a system bus). User compute device 100 can be any type of compute device, such as a server, desktop, laptop, tablet, smartphone, and/or the like. In some implementations, though not shown in FIG. 1, user compute device 100 can include an area with a controlled lighting condition that can be used to capture images and/or videos of cards whose authenticity is to be determined. In some implementations, user compute device 100 is a mobile device that is able to capture images and/or videos of cards whose authenticity is to be determined.

Processor 102 can be, for example, a hardware-based integrated circuit (IC) or any other suitable processing device configured to run and/or execute a set of instructions or code. For example, processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processor 102 can be configured to run and/or execute the methods and/or portions of methods discussed herein.

Memory 104 can be, for example, a random-access memory (RAM), a memory buffer, a hard drive, a read-only memory (ROM), an erasable programmable read-only memory (EPROM), and/or the like. Memory 104 can be configured to store data used by processor 102 to perform the techniques (methods, processes, etc.) discussed herein. In some instances, memory 104 can store, for example, one or more software programs and/or code that can include instructions to cause processor 102 to perform one or more processes, functions, and/or the like. In some implementations, memory 104 can include extendible storage units that can be added and used incrementally. In some implementations, memory 104 can be a portable memory (for example, a flash drive, a portable hard disk, an SD card, and/or the like) that can be operatively coupled to processor 102. In some instances, memory 104 can be remotely operatively coupled with a compute device (not shown in FIG. 1). In some instances, memory 104 is a virtual storage drive (e.g., RAMDisk), which can improve I/O speed and in turn, accelerate image reading and writing.

Memory 104 includes (e.g., stores) a representation (e.g., image) of card 106. Card 106 represents a card whose authenticity is to be determined. Card 106 can be, for example, an image or video of the card (that includes the predetermined portion of the card). In some implementations, user compute device 100 includes a camera (not shown in FIG. 1) configured to capture a picture(s) and/or video(s) that includes the predetermined portion of card 106. In some implementations, card 106 is an image of a card captured in a controlled lighting condition. In some implementations, an image of a card can be captured, and any area other than the card can be cropped from the image to generate card 106. Thereafter, a representation of card 106 can be sent to authenticity compute device 140 (e.g., via the network 120).

Upon receiving card 106, authenticity compute device 140 can be configured to use image classifier 152 to determine a card type of card 106. For example, image classifier 152 may determine that the card type of card 106 is a 1996 "Pocket Monsters" Pokémon card. As another example, image classifier 152 may determine that the card type of card 106 is a 1996 "Pocket Monsters" Holofoil Edition Pokémon card. As another example, image classifier 152 may determine that the card type of card 106 is a Yu-Gi-Oh! card. Thereafter, authenticity compute device can determine the trained ML model(s) from trained ML models 150 trained to determine authenticity for that card type, optionally extract features from the predetermined portion of card 106, and provide an image of card 106 and/or the extracted features to the trained ML model(s) to generate an output indicating authenticity of card 106.

In some implementations, upon determining an authenticity of a card, an indication of that authenticity is output at user compute device 100, authenticity compute device 140, and/or a different compute device not shown in FIG. 1. For example, authenticity compute device 140 can send an electronic signal to user compute device 100 (e.g., via the network 120) indicating authenticity of card 106, and user compute device 100 can display an indication of the authenticity via a display included in user compute device 100. The indication can be, for example, "authentic," "counterfeit," "95% chance of being authentic," and/or the like.

In some implementations, upon determining that a card is authentic or that the likelihood of the card being authentic is above a predetermined threshold, a subsequent action can occur (e.g., automatically and without human intervention). Examples of subsequent actions include providing an option to have the card graded (e.g., mint condition, good condition, etc.) or grading the card (e.g., as discussed in U.S. patent application Ser. No. 17/674,328, titled "METHODS AND APPARATUS FOR GRADING IMAGES OF COLLECTABLES USING IMAGE SEGMENTATION AND IMAGE ANALYSIS" and filed Feb. 17, 2022, the contents of which are incorporated by reference herein in its entirety).

In some implementations, if an authenticity of card 106 cannot be determined (e.g., an image of card 106 is too blurry to analyze by authenticity compute device 140), authenticity compute device 140 can send an electronic signal to user compute device 100 indicating that the authenticity of card 106 cannot be determined. Additionally or alternatively, authenticity compute device 140 can send an electronic signal to user compute device 100 with a suggestion to improve the likelihood that an authenticity of card 106 can be determined, such as provide a less blurry picture of the card, provide a picture of the card with the card having a different background, provide a brighter picture of the card, provide a larger picture of the card, and/or the like.

In some implementations, an image quality of card 106 is determined, such as determining a blur, noise, exposure, distortion, size, orientation, and/or the like. In some implementations, if the image quality of card 106 is outside a predetermined acceptable range, an authenticity of card 106 is not determined. For example, in response to user compute device 100 and/or authenticity compute device 140 determining that the image quality of card 106 is outside the predetermined acceptable range, features of card 106 are not extracted, card 106 is not input into trained ML models 150, and/or card 106 is not input into image classifier 152. As another example, in response to user compute device 100 and/or authenticity compute device 140 determining that the image quality of card 106 is within the predetermined acceptable range, features of card 106 are extracted, card 106 is input into trained ML models 150, and/or card 106 is input into image classifier 152.

In some implementations, an image quality of card 106 is determined using a trained ML model (not shown in FIG. 1); for example, the trained ML model can be a neural network trained using images having different image qualities as input learning data and associated representations of qualities (e.g., quality scores) of those images at target learning data. In some implementations, such as where trained ML models 150 includes different types of ML models, those different types of models can be associated with different predetermined acceptable ranges. For example, a first trained ML model from trained ML models 150 can be configured to receive images of cards (1) that are a first card type and (2) having an image quality score between 8/10 and 10/10 while a second trained ML model from trained ML models 150 can be configured to receive images of cards (1) that are a second card type and (2) having an image quality score between 6/10 and 10/10.

In some implementations, because authenticity compute device 140 is remote/communicably coupled to network 120, authenticity compute device 140 is configured to receive a plurality of cards being a plurality of card types from a plurality of remote user compute devices (e.g., user compute device 100 and user compute devices not shown in FIG. 1). Accordingly, rather than having the plurality of remote user compute devices perform steps like preprocessing, feature extraction, and/or applying models (which can be dependent upon individual end-user hardware and operating systems; which can be time consuming to install on multiple end-user client machines; which can require end-user's client machines to frequently download software updates to implement techniques described herein), authenticity compute device 140 can perform such functions. Authenticity compute device 140 can then perform those functions in a manner that is specific to each card and card type.

Although FIG. 1 includes two compute devices, in some implementations, any number of compute devices can be used. For example, a single compute device can be configured to perform the functionalities of both user compute device 100 and authenticity compute device 140 (e.g., if local processing is desirable, if there is no network available, etc.). As another example, in addition to user compute device 100, a first compute device can be configured to determine a card type using image classifier 152, and a second compute device can be configured to train, generate, and use trained ML models 150 using cards 146 and sets of features 148.

Figure 2A:
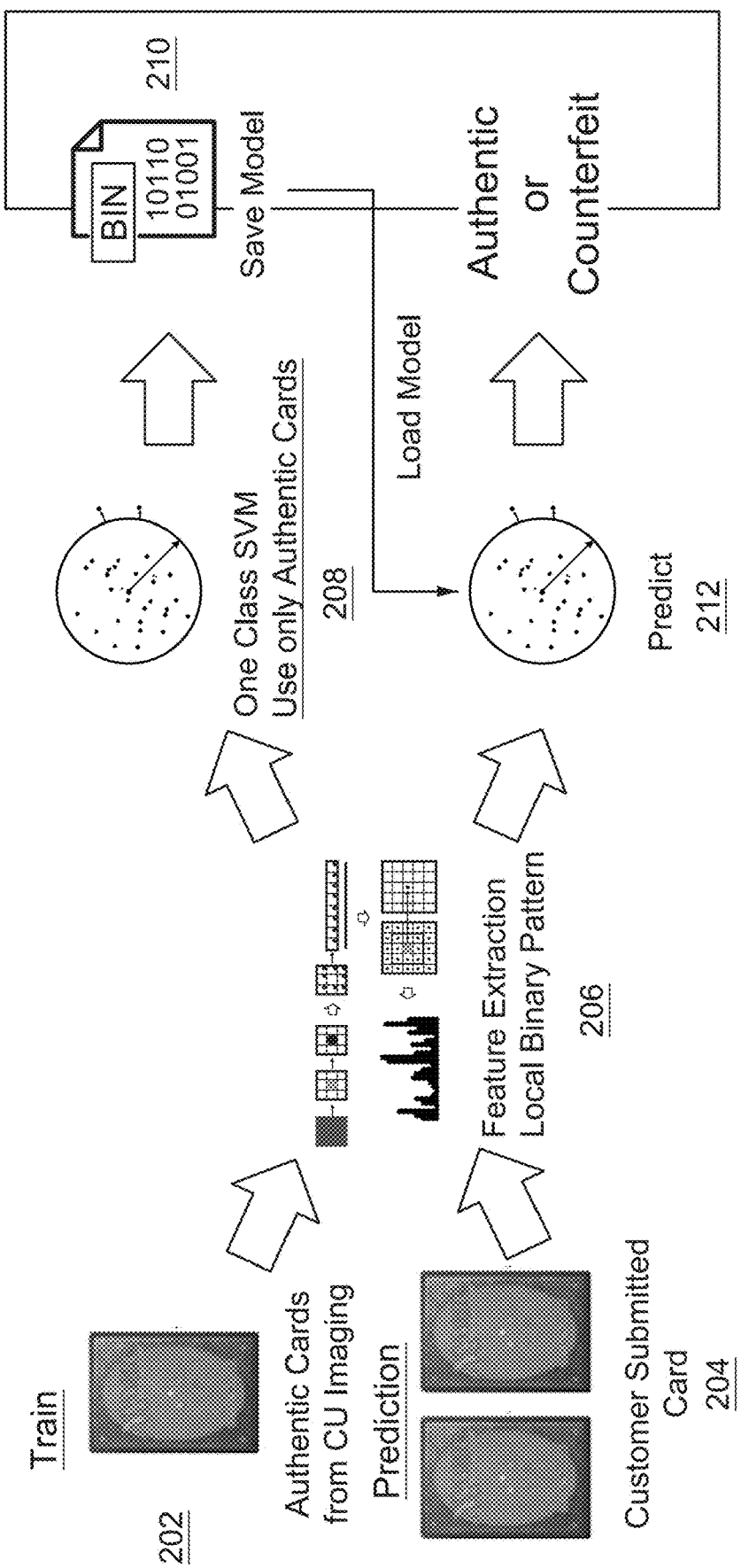
FIG. 2A illustrates a method to train and use a model, according to an embodiment.
Figure 2B:
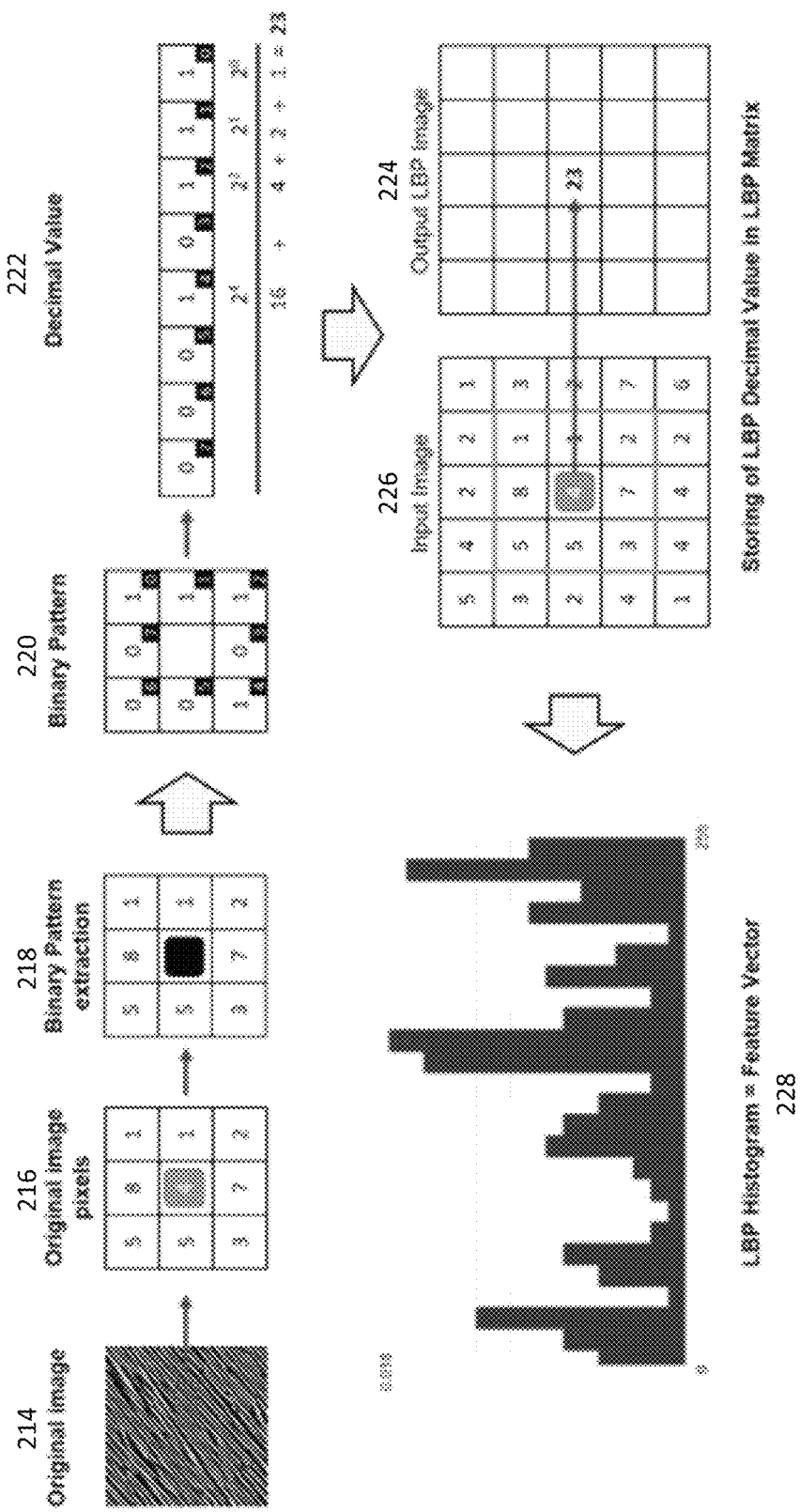
FIG. 2B visualizes a calculation of Local Binary Pattern (LBP), according to an embodiment.

FIG. 2A illustrates a method to train and use a model, according to an embodiment. At 202, authentic cards of a card type are received. The authentic cards can be authentic cards of the card type. For example, as shown at 202 of FIG. 2A, the authentic cards can be Magic: The Gathering cards. At 206, feature extraction can be performed using the authentic cards from 202 (e.g., on a predetermined portion of each of the cards that can be specific and/or unique to that card type). An example of a feature extraction technique that can be used is local binary pattern. Additional details related to 206 are shown at FIG. 2B. At 208, the extracted features from 206 using the cards from 202 can be used to train an ML model, such as, for example, a one class support vector machine (SVM). Upon completing training, the model can be saved at 210. At 204, a card whose authenticity is to be determined can be received. Features from the card at 204 can be extracted at 206, and provided to the model from 210 at 212 to predict if the card is authentic or counterfeit.

FIG. 2B visualizes a calculation of Local Binary Pattern (LBP), according to an embodiment. FIG. 2B includes original image 214. Original image 214 can be a predetermined portion, such as the backside of a card or a predefined upper left region of a card. In other implementations, original image 214 can be a complete image of the card. Each pixel (or group of pixels) in original image 214 can be associated with a pixel value. For example, the original image pixels 216 shows a selected portion of the original image 214. In the original image pixels 216, the center pixel has a pixel value of 4, the upper leftmost pixel in the selected portion of the original image 214 has a pixel value of 5, and so on. For each pixel value, the adjacent pixel values can be identified. For example, as shown in original image pixels 216, the adjacent pixel values of the center pixel value 4 are 5, 8, 1, 1, 2, 7, 3, and 5. As shown in binary pattern extraction 218, the center pixel value from original image pixels 216 (in this example, 4) can be used to compare against the adjacent pixel values to derive a binary pattern. In this example, if the center pixel value from original image pixels 216 is equal to or larger than (or in other implementations, larger than) a given adjacent pixel value, the value associated with that given adjacent pixel value in the binary pattern is 0; if the center pixel value from original image pixels 216 is less than (or in other implementations, equal to or less than) a given adjacent pixel value, the value associated with that given adjacent pixel value in the binary pattern is 1. This transformation can be seen in the binary pattern 220 where pixel values greater than or equal to 4 are set to 0 and pixel values less than 4 are set to 1.

Thereafter, as shown in decimal value 222, an array of binary values can be determined and/or defined based on predefined positions of the 1s and 0s in the binary pattern 220. For example, the various positions can be assigned a place value for a binary value (e.g., top right corner is the 0th place and the place values are incremented as moved clockwise around the binary pattern 220).

A binary value can then be defined based on this array. Specifically, in this example, binary number "00010111" as shown in decimal value 222 corresponds to decimal number 23. The decimal value (e.g., 23 in this example) can then be provided as the value for the pixel in question in an output LBP image 224. Similarly stated, because the pixel values surrounding the center pixel(s) of the portion of the input image 226 were used to arrive at 23, the center pixel(s) of output LBP image 224 is transformed to 23. The aforementioned process can occur for each value in input image 226 (or the predetermined portion of input image 226) so that each element in output LBP image 224 is associated with a value. Thereafter, output LBP image 224 can be used to generate LBP histogram 228. LBP histogram 228 can represent a number of pixels (Y-axis) with a given output LBP value (or within a given range of output LBP values) (X-axis). LBP histogram 228 and/or output LBP image 224 can represent features (e.g., included in sets of features 148) associated with original image 214. This can define the feature vector (e.g., sets of features 148 of FIG. 1) used to train and/or as an input to a machine learning model (e.g., trained ML models 150 or image classifier 152 of FIG. 1 or one class SVM 208 of FIG. 2A).

Although FIGS. 2A-2B are discussed in the context of using authentic cards to train, in other implementations, counterfeit cards can also be used in training. If both authentic cards and counterfeit cards are used in training, in some implementations, supervised learning can occur.

Figure 3:
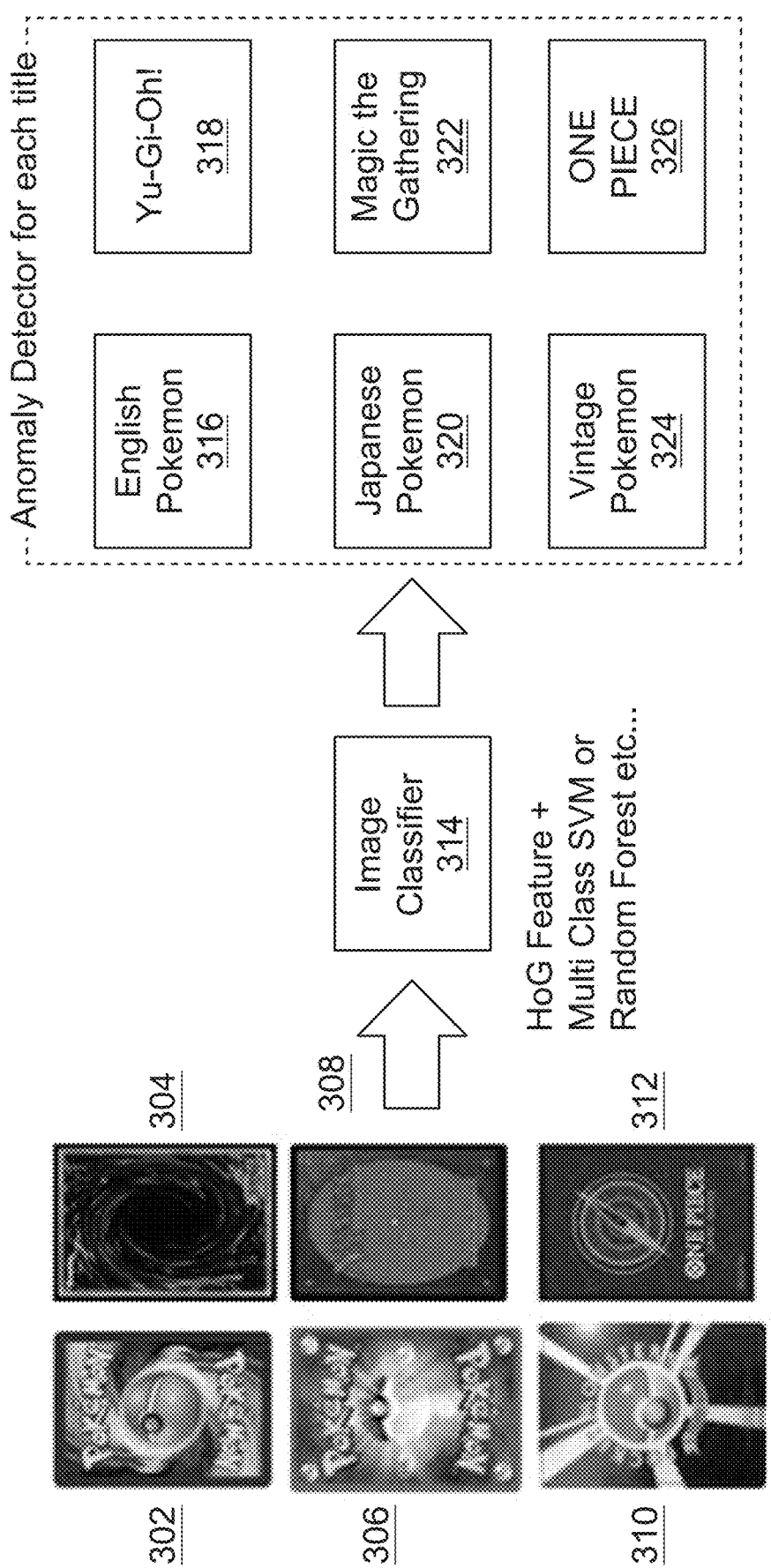
FIG. 3 illustrates using an image classifier to determine authenticity for different card types, according to an embodiment.

FIG. 3 illustrates using an image classifier to determine authenticity for different card types, according to an embodiment. FIG. 3 shows various cards that are each a different card type, including card 302 that is an English Pokemon card type, card 304 that is a Yu-Gi-Oh! card type, card 306 that is a Japanese Pokémon card type, card 308 that is a Magic: The Gathering card type, card 310 that is a vintage Pokémon card type, and card 312 that is a One Piece card type. FIG. 3 also shows various models (e.g., included in trained ML models 150) trained to determine authenticity of a predetermined card type, including model 316 trained for determining authenticity of English Pokémon cards, model 318 trained for determining authenticity of Yu-Gi-Oh! cards, model 320 trained for determining authenticity of Japanese Pokémon cards, model 322 trained for determining authenticity of Magic: The Gathering cards, model 324 trained for determining authenticity of Vintage Pokémon cards, and model 326 trained for determining authenticity of One Piece cards.

For each card, image classifier 314 (e.g., similar to image classifier 152) can determine the card type so that the ML model trained for determining authenticity of the determined card type can be used. For example, image classifier 314 can determine that card 302 is an English Pokémon card type so that model 316 can be used to determine if card 302 is an authentic English Pokémon card, image classifier 314 can determine that card 304 is a Yu-Gi-Oh! card type so that model 318 can be used to determine if card 304 is an authentic Yu-Gi-Oh! card, image classifier 314 can determine that card 306 is a Japanese Pokémon card type so that model 320 can be used to determine if card 306 is an authentic Japanese Pokémon card, image classifier 314 can determine that card 308 is a Magic: The Gathering card type so that model 320 can be used to determine if card 308 is an authentic Magic: The Gathering card, image classifier 314 can determine that card 310 is a vintage Pokémon card type so that model 324 can be used to determine if card 310 is an authentic vintage Pokémon card, and image classifier 314 can determine that card 312 is a One Piece card type so that model 326 can be used to determine if card 312 is an authentic One Piece card.

Image classifier 314 can use any suitable technique to determine the card type. For example, in some implementations, image classifier 314 compares text (e.g., extracted using optical character recognition (OCR)) and/or images (e.g., using image analytics) from a representation of a card whose card type is not yet known with text and/or images from representations of cards whose card type is already known for a match (a match indicating the card type). For example, if a card whose card type is not yet known includes the text "Pocket Monster" and has a vintage Pokéball icon, image classifier 314 can determine what known card type includes the text "Pocket Monster" and has a vintage Pokéball icon. As another example, in some implementations, image classifier 314 is a machine learning model trained using different card types (e.g., a neural network trained using representations of cards as input learning data and the associated card type as target learning data). The trained image classifier 314 can then receive a representation of an unknown card and can identify the type of that unknown card. In some implementations, Histogram of Oriented Gradients (HoG) can be used to extract features from the representations of the cards and a machine learning model (e.g., a multi-class SVM or a random forest) can be used to classify the cards.

Figure 4:
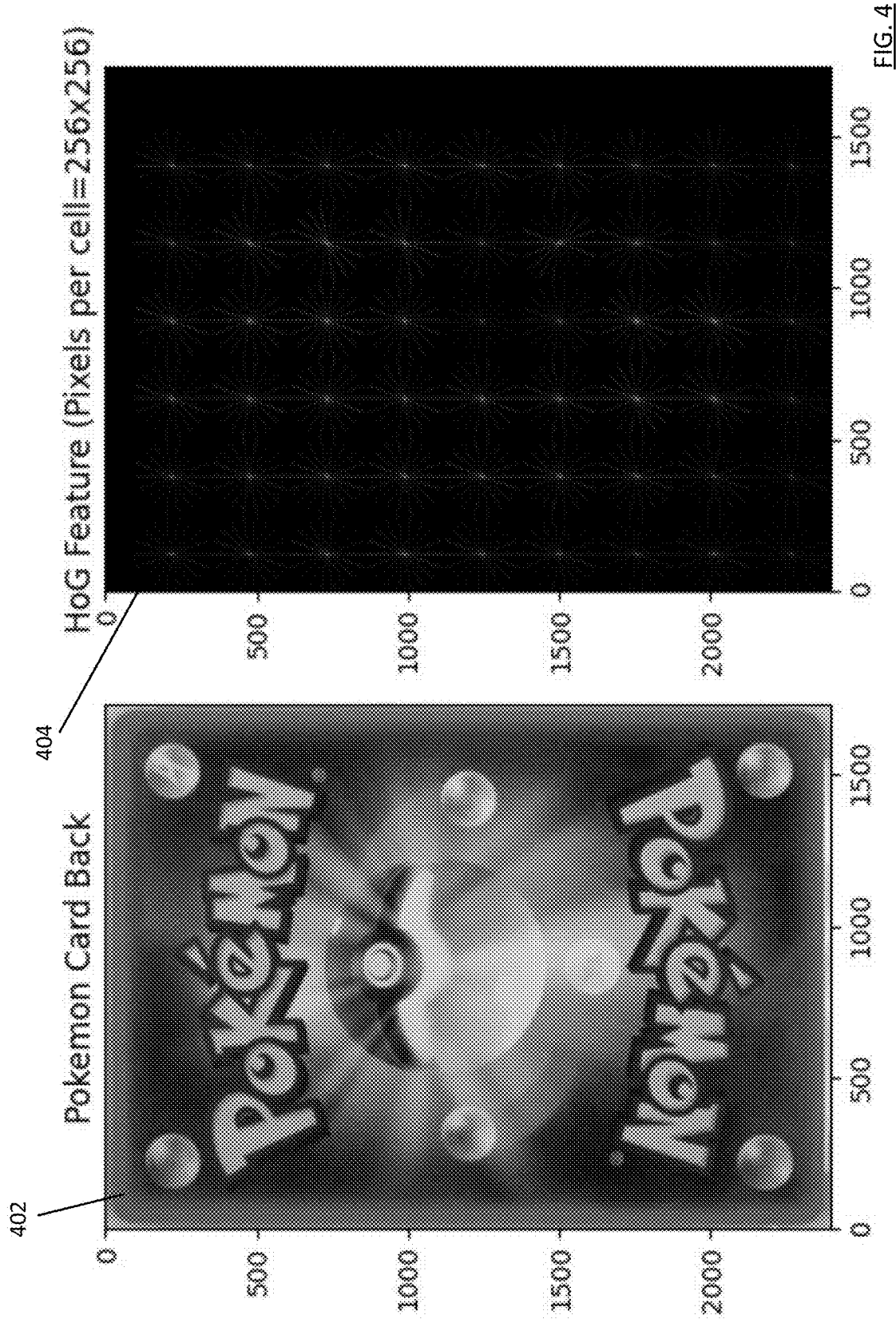
FIG. 4 illustrates an example of using histogram of oriented gradients (HoG) to perform feature extraction, according to an embodiment.

In some implementations, histogram of oriented gradients (HoG) can be used to extract features (e.g., to extract sets of features 148 from cards 146). FIG. 4 illustrates an example of using HoG to perform feature extraction, according to an embodiment. Image 402 is an image of the backside of a Pokémon card, and representation 404 represents an outcome of applying HoG to image 402. For example, representation 404 can represent a strength of each gradient in each cell from image 402.

Figure 5:
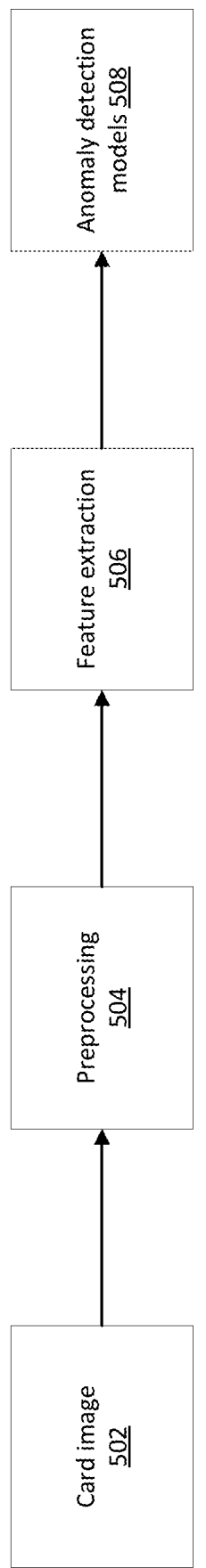
FIG. 5 illustrates an example of performing anomaly detection and performing feature extraction, according to an embodiment.

FIG. 5 illustrates an example of performing anomaly detection while performing feature extraction, according to an embodiment. At 502, an image of a card (e.g., card 106 of FIG. 1) is received (e.g., at authenticity compute device 140 from user compute device 100 of FIG. 1). At 504, preprocessing is performed using the image of the card. Preprocessing can include, for example, removing noise, modifying contrast, removing or modifying a background, determining whether quality of card image 502 is within a predetermined acceptable range, and/or the like. Preprocessing can, for example, modify card image 502 into a standard format, which can allow an authenticity of the card represented in card image 502 to be determined more accurately. At 506, feature extraction is performed based on the preprocessed card image generated at 504. Feature extraction at 506 can include, for example, performing LBP, LTP, LPQ, LDTP, HoG, gabor filters, LPC, deep learning, LBPH, and/or the like. At 508, the output from 506 is input into anomaly detection models (e.g., trained ML models 150 of FIG. 1) to determine whether the card represented by card image 502 is authentic or includes an anomaly suggesting that the card is counterfeit. The anomaly detection models can include, for example, a one class SVM, isolation forest, local outlier factor, density-based model, statistical-based model, and/or the like.

Figure 6:
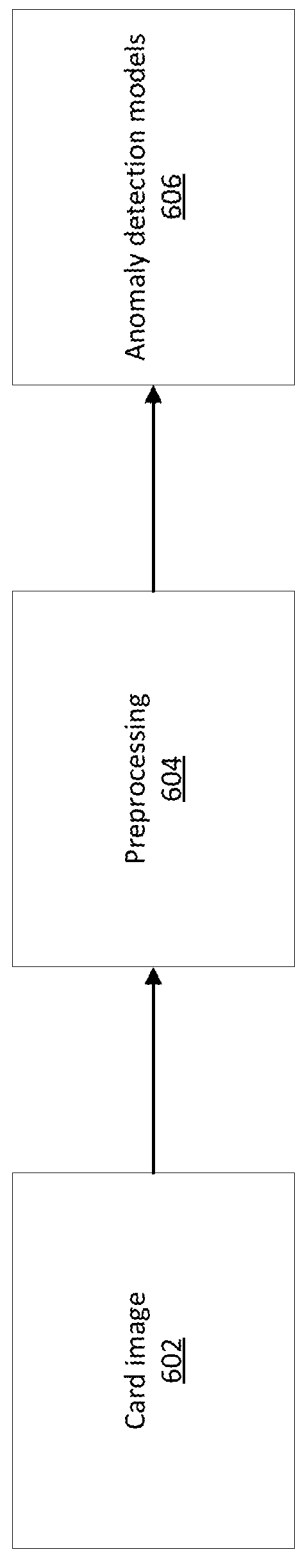
FIG. 6 illustrates an example of performing anomaly detection without performing feature extraction, according to an embodiment.

FIG. 6 illustrates an example of performing anomaly detection without performing feature extraction, according to an embodiment. At 602, an image of a card (e.g., card 106 of FIG. 1) is received (e.g., at authenticity compute device 140 from user compute device 100 of FIG. 1). At 604, preprocessing is performed using the image of the card. Preprocessing can include, for example, removing noise, modifying contrast, removing or modifying a background, determining whether quality of card image 602 is within a predetermined acceptable range, and/or the like. Preprocessing can, for example, modify card image 602 into a standard format, which can allow an authenticity of the card represented in card image 602 to be determined more accurately. At 606, the output from 604 is input into anomaly detection models (e.g., trained ML models 150 of FIG. 1) to determine whether the card represented by card image 602 is authentic or includes an anomaly suggesting that the card is counterfeit. The anomaly detection models can include, for example, a deep auto encoder model, deep nearest neighbor anomaly detection model, SPADE model, PaDiM model, PatchCore model, and/or the like. In some implementations, 606 occurs in response to 604 without performing feature extraction; said differently, feature extraction is not performed between 604 and 606.

Although FIGS. 1-6 were discussed in the context of cards, techniques described herein can be applied to any type of object whose authenticity is to be determined based on a pattern or material, such as, for example, coins, figurines, books, currency, hardware, apparel, video game cartridges, watches, shoes, paintings, photographs and/or the like. For example, a predetermined portion of a type of comic book can be intended and/or manufactured to be common among authentic comic books of that type. The systems, apparatus and methods shown and described with respect to FIGS. 1-6 can extract features of the predetermined portion of a comic book and identify whether the comic book is authentic or inauthentic. Similarly, a predetermined portion of a currency can be intended and/or manufactured to be common among authentic currency of that type and the systems, apparatus and methods shown and described with respect to FIGS. 1-6 can extract features of the predetermined portion of the currency and identify whether the currency is authentic or inauthentic. In some implementations, the systems and methods described with respect to FIG. 6 can also be used to identify a type of item (e.g., type of comic book, type of currency, etc.). In some implementations, techniques described herein analyze the characteristics of patterns/materials (e.g., printed, embossed, manufactured, etc. patterns/materials) for a collectible to determine the collectible's authenticity. Accordingly, in some implementations, techniques described herein may not apply to a collectible where analysis of that collectible's pattern/materials would not be revealing of that collectible's authenticity.

FIG. 7 shows a flowchart of a method 700 to train an ML model to produce an output indicating an authenticity of a collectible associated with an image, according to an embodiment. In some implementations, method 700 is stored as code in a memory (e.g., memory 144 of FIG. 1) and performed and/or executed by a processor (e.g., processor 142 of FIG. 1).

At 702, a plurality of images (e.g., cards 146 of FIG. 1) having an image type (e.g., card type) are received. Each image from the plurality of images includes a predetermined portion (e.g., backside, corner portion, logo, etc.). At 704, for each image from the plurality of images and to generate a plurality of sets of features (e.g., sets of features 148 of FIG. 1) associated with the plurality of image, feature extraction is performed based on the predetermined portion of that image and not remaining portions of that image to generate a set of features associated with that image. In some implementations, 704 occurs automatically (e.g., without human intervention) in response to completing 702. At 706, a machine learning (ML) model is trained using the plurality of sets of features associated with the plurality of images to generate a trained ML model (e.g., included in trained ML models 150 of FIG. 1). In some implementations, 706 occurs automatically (e.g., without human intervention) in response to completing 704. At 708, an image (e.g., card 106 of FIG. 1) (1) not included in the plurality of images, (2) that is the image type, and (3) has the predetermined portion is received (e.g., from user compute device 100 of FIG. 1). At 710, feature extraction is performed based on the predetermined portion of the image and not remaining portions of the image to generate a set of features associated with the image. In some implementations, 708 occurs automatically (e.g., without human intervention) in response to completing 708. At 712, the set of features associated with the image is input to the trained ML model to generate an output indicating an authenticity of a collectible associated with (e.g., represented by, that is the subject of, that is included in) the image. In some implementations, 712 occurs automatically (e.g., without human intervention) in response to completing 710.

In some implementations of method 700, the ML model is a one class support vector machine (SVM).

In some implementations of method 700, performing the feature extraction includes performing feature extraction via histogram of oriented gradients (HoG).

In some implementations of method 700, performing the feature extraction includes performing feature extraction via at least one of local binary pattern (LBP), local ternary pattern (LTP), local phase quantization (LPQ), local derivative ternary pattern (LDTP), gabor filters, local phase congruency (LPC), deep learning, or local binary pattern histogram (LBPH).

In some implementations of method 700, the plurality of images is a first plurality of images, the image type is a first image type, the trained ML model is a first trained ML model, the ML model is a first ML model, the image is a first image, and method 700 further includes receiving a second plurality of images having a second image type different than the first image type. Each image from the second plurality of images has the predetermined portion. Some implementations of method 400 further include, for each image from the second plurality of images and to generate a plurality of sets of features associated with the second plurality of images, performing feature extraction based on the predetermined portion of that image and not remaining portions of that image to generate a set of features associated with that image. Some implementations of method 700 further include training, to generate a second trained ML model (e.g., included in trained ML models 150) different than the first trained ML model, a second ML model using the plurality of sets of features associated with the second plurality of images. Some implementations of method 700 further include receiving a second image that is the second image type and has the predetermined portion. Some implementations of method 400 further include performing feature extraction based on the predetermined portion of the second image and not remaining portions of the second image to generate a set of features associated with the second image. Some implementations of method 700 further include inputting the set of features associated with the second image to the second trained ML model but not the first trained ML model to generate an output indicating an authenticity of a collectible associated with the second image.

In some implementations of method 700, the plurality of images includes images of authentic collectibles and image of counterfeit collectibles, and training the ML model to generate the trained ML model is done via supervised learning.

In some implementations of method 700, the plurality of images includes images of authentic collectibles and not images of counterfeit collectibles, and training the ML model to generate the trained ML model is done via unsupervised learning.

In some implementations of method 700, the ML model includes at least one of an isolation forest model, a local outlier factor model, an autoencoder, a density-based model, or a statistical-based model.

In some implementations of method 700, the ML model includes at least one of a deep nearest neighbor anomaly detection model, a semantic pyramid anomaly detection (SPADE) model, a patch distribution modeling framework for anomaly detection and localization (PaDiM) model, an autoencoder, or a towards total recall in industrial anomaly detection (PatchCore) model.

Some implementations of method 700 further include confirming, before at least one of the performing the feature extraction at 710 or the inputting the set of features at 712, that a quality associated with the image is within a predetermined acceptable quality range. The predetermined acceptable quality range can be determined based on the trained ML model.

In some implementations of method 700, the image is a first image and method 700 further includes receiving a second image (1) not included in the plurality of images, (2) that is the image type, and (3) has the predetermined portion. Some implementations of method 700 further include determining that a quality associated with the second image is outside a predetermined acceptable quality range associated with the trained ML model. Some implementations of method 700 further include refraining, in response to determining that the quality associated with the second image is outside the predetermined acceptable quality range, from at least one of performing feature extraction based on the second image or inputting features associated with the second image into the trained ML model.

FIG. 8 shows a flowchart of a method 800 to determine whether collectibles associated with different images of different image types are authentic or counterfeit, according to an embodiment. In some implementations, method 800 is stored as code in a memory (e.g., memory 144 of FIG. 1) and performed and/or executed by a processor (e.g., processor 142 of FIG. 1).

At 802, a plurality of images (e.g., cards 302, 304, 306, 308, 310, 312 of FIG. 3) having a plurality of image types are received. At 804, for each image type from the plurality of image types and to generate a plurality of subsets of images, a subset of images from the plurality of images being that image type is identified using an image classifier (e.g., image classifier 152 of FIG. 1 and/or 314 of FIG. 3). In some implementations, 804 occurs automatically (e.g., without human intervention) in response to completing 802. At 806, for each subset of images from the plurality of subsets of images, feature extraction is performed on each image from that subset of images to generate features associated with that image. In some implementations, 806 occurs automatically (e.g., without human intervention) in response to completing 804. At 808, for each subset of images from the plurality of subsets of images, the features associated with each image from that subset of images is input to a trained ML model from a plurality of trained ML models (e.g., trained ML models 150 of FIG. 1 and/or models 316, 318, 320, 322, 324, 326 of FIG. 3) to generate an output indicating whether a collectible associated with that image is authentic or counterfeit. Each trained ML model from the plurality of trained ML models is associated with an image type from the plurality of image types that is different for remaining trained ML models from the plurality of trained ML models. In some implementations, 808 occurs automatically (e.g., without human intervention) in response to completing 806.

FIG. 9 shows a flowchart of a method 900 to train a machine learning model using multiple images of authentic cards that are each a card type, according to an embodiment. In some implementations, method 900 is stored as code in a memory (e.g., memory 144 of FIG. 1) and performed and/or executed by a processor (e.g., processor 142 of FIG. 1).

At 902, a representation of a plurality of cards (e.g., cards 146 of FIG. 1) having a card type are received. Each card from the plurality of cards has a predetermined portion associated with the card type. At 904, for each card from the plurality of cards and to generate a plurality of sets of features (e.g., sets of features 148 of FIG. 1) associated with the plurality of cards, local binary pattern (LBP) feature extraction is performed based on the predetermined portion of that card and not remaining portions of that card to generate a set of features associated with that card. In some implementations, 904 occurs automatically (e.g., without human intervention) in response to completing 902. At 906, an ML model is trained using the plurality of sets of features associated with the plurality of cards to generate a trained ML model (e.g., included in trained ML models 150). In some implementations, 906 occurs automatically (e.g., without human intervention) in response to completing 904.

In some implementations of method 900, the plurality of cards includes authentic cards and counterfeit cards, and training the ML model to generate the trained ML model is done via supervised learning.

In some implementations of method 900, the plurality of cards includes authentic cards and not counterfeit cards, and training the ML model to generate the trained ML model is done via unsupervised learning.

FIG. 10 shows a flowchart of a method 1000 to determine, without performing feature extraction, whether collectibles associated with different images of different image types are authentic or counterfeit, according to an embodiment. In some implementations, method 1000 is stored as code in a memory (e.g., memory 144 of FIG. 1) and performed and/or executed by a processor (e.g., processor 142 of FIG. 1).

At 1002, a plurality of images of a plurality of collectibles (e.g., cards 302, 304, 306, 308, 310, 312 of FIG. 3) having a plurality of collectible types is received. At 1004, for each collectible type from the plurality of collectible types and to generate a plurality of subsets of images, a subset of images from the plurality of images representing a collectible from the plurality of collectibles being that collectible type are identified using an image classifier (e.g., image classifier 152 of FIG. 1 and/or 314 of FIG. 3). In some implementations, 1004 occurs automatically (e.g., without human intervention) in response to completing 1002. At 1006, for each subset of images from the plurality of subsets of images, a representation of each image from that subset of images, without performing feature extraction on that image, is input to a trained ML model from a plurality of trained ML models (e.g., trained ML models 150 of FIG. 1) to generate an output indicating whether a collectible represented by that image is authentic or counterfeit. Each trained ML model from the plurality of trained ML models is associated with a collectible type from the plurality of collectible types that is different for remaining trained ML models form the plurality of trained ML models. The plurality of trained ML models include at least one of a deep auto encoder model, a deep nearest neighbor anomaly detection model, a semantic pyramid anomaly detection (SPADE) model, a patch distribution modeling framework for anomaly detection and segmentation (PaDiM) model, or an anomaly detection using patch-level features and core-set selection (PatchCore) model.

In some implementations of method 1000, the at least one ML model from the plurality of trained ML models is trained (1) using a training dataset that includes images of authentic collectibles and images of counterfeit collectibles, and (2) via supervised learning.

In some implementations of method 1000, the least one ML model from the plurality of trained ML models is trained using (1) a training dataset that includes images of authentic collectibles and not images of counterfeit collectibles, and (2) via unsupervised learning.

In some implementations of method 1000, at least one ML model from the plurality of trained ML models is trained using a training dataset that includes a non-synthetic image of a card and a synthetic image of a card. The non-synthetic image of the card can be augmented to generate the synthetic image of the card. In some implementations, augmenting the non-synthetic image of the card to generate the synthetic image of the card includes augmenting a predetermined portion of the non-synthetic image and not remaining portions of the non-synthetic image.

Combinations of the foregoing concepts and additional concepts discussed herein (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

What is claimed is:

1. A non-transitory, processor-readable medium storing instructions that, when executed by a processor, cause the processor to:
    receive a plurality of images having an image type, each image from the plurality of images including a predetermined portion, the plurality of images including a non-synthetic image and a synthetic image, the synthetic image generated by augmenting the predetermined portion of the non-synthetic image and not remaining portions of the non-synthetic image;
    for each image from the plurality of images and to generate a plurality of sets of features associated with the plurality of images, perform feature extraction based on the predetermined portion of that image and not remaining portions of that image to generate a set of features associated with that image;
    train, to generate a trained machine learning (ML) model, an ML model using the plurality of sets of features associated with the plurality of images;
    receive an image (1) not included in the plurality of images, (2) that is the image type, and (3) has the predetermined portion;

perform feature extraction based on the predetermined portion of the image and not remaining portions of the image to generate a set of features associated with the image; and input the set of features associated with the image to the trained ML model to generate an output indicating an authenticity of a collectible associated with the image.

2. The non-transitory, processor-readable medium of claim 1, wherein the ML model is a one class support vector machine (SVM).

3. The non-transitory, processor-readable medium of claim 1, wherein performing the feature extraction includes performing feature extraction via histogram of oriented gradients (HOG).

4. The non-transitory, processor-readable medium of claim 1, wherein performing the feature extraction includes performing feature extraction via at least one of local binary pattern (LBP), local ternary pattern (LTP), local phase quantization (LPQ), local derivative ternary pattern (LDTP), gabor filters, or local phase congruency (LPC).

5. The non-transitory, processor-readable medium of claim 1, wherein the plurality of images is a first plurality of images, the image type is a first image type, the trained ML model is a first trained ML model, the ML model is a first ML model, the image is a first image, and the non-transitory, processor-readable medium further stores instructions to cause the processor to:

receive a second plurality of images having a second image type different than the first image type, each image from the second plurality of images having the predetermined portion;

for each image from the second plurality of images and to generate a plurality of sets of features associated with the second plurality of images, perform feature extraction based on the predetermined portion of that image and not remaining portions of that image to generate a set of features associated with that image;

train, to generate a second trained ML model different than the first trained ML model, a second ML model using the plurality of sets of features associated with the second plurality of images;

receive a second image that is the second image type and has the predetermined portion;

perform feature extraction based on the predetermined portion of the second image and not remaining portions of the second image to generate a set of features associated with the second image; and input the set of features associated with the second image to the second trained ML model but not the first trained ML model to generate an output indicating an authenticity of a collectible associated with the second image.

6. The non-transitory, processor-readable medium of claim 1, wherein
the plurality of images includes images of authentic collectibles and images of counterfeit collectibles, and
training the ML model to generate the trained ML model is done via supervised learning.

7. The non-transitory, processor-readable medium of claim 1, wherein
the plurality of images includes images of authentic collectibles and not images of counterfeit collectibles, and
training the ML model to generate the trained ML model is done via unsupervised learning.

8. The non-transitory, processor-readable medium of claim 1, wherein the ML model includes at least one of an isolation forest model, a local outlier factor model, an autoencoder, a density-based model, or a statistical-based model.

9. The non-transitory, processor-readable medium of claim 1, wherein the ML model includes at least one of a deep nearest neighbor anomaly detection model, a semantic pyramid anomaly detection (SPADE) model, a patch distribution modeling framework for anomaly detection and localization (PaDiM) model, an autoencoder, or a towards total recall in industrial anomaly detection (PatchCore) model.

10. The non-transitory, processor-readable medium of claim 1, wherein the non-transitory, processor-readable medium further stores instructions to cause the processor to:
confirm, before at least one of the performing the feature extraction or the inputting the set of features, that a quality associated with the image is within a predetermined acceptable quality range, the predetermined acceptable quality range determined based on the trained ML model.

11. The non-transitory, processor-readable medium of claim 1, wherein the image is a first image and the non-transitory, processor-readable medium further stores instructions to cause the processor to:
receive a second image (1) not included in the plurality of images, (2) that is the image type, and (3) has the predetermined portion;
determine that a quality associated with the second image is outside a predetermined acceptable quality range associated with the trained ML model; and
refrain, in response to determining that the quality associated with the second image is outside the predetermined acceptable quality range, from at least one of performing feature extraction based on the second image or inputting features associated with the second image into the trained ML model.

12. The non-transitory, processor-readable medium of claim 1, wherein the image type is a first image type and the non-transitory, processor-readable medium of claim 1 further stores instructions that, when executed by the processor, cause the processor to:
identify the plurality of images having the first image type from a collection of images having a plurality of image types, the plurality of image types including the first image type and a second image type different than the first image type.

13. A method, comprising:
receive a first plurality of images having a first image type, each image from the first plurality of images including a predetermined portion;
for each image from the first plurality of images and to generate a plurality of sets of features associated with the first plurality of images, perform feature extraction based on the predetermined portion of that image and not remaining portions of that image to generate a set of features associated with that image;
receive a first image (1) not included in the first plurality of images, (2) that is the first image type, and (3) has the predetermined portion;
perform feature extraction based on the predetermined portion of the first image and not remaining portions of the first image to generate a set of features associated with the first image;
input the set of features associated with the first image to a first trained machine learning (ML) model to generate an output indicating an authenticity of an object associated with the first image, a first ML model trained using the plurality of sets of features associated with the first plurality of images to generate the first trained ML model;

receive a second plurality of images having a second image type different than the first image type, each image from the second plurality of images having the predetermined portion;

for each image from the second plurality of images and to generate a plurality of sets of features associated with the second plurality of images, perform feature extraction based on the predetermined portion of that image and not remaining portions of that image to generate a set of features associated with that image;

receive a second image (1) not included in the second plurality of images, (2) that is the second image type, and (3) has the predetermined portion;

perform feature extraction based on the predetermined portion of the second image and not remaining portions of the second image to generate a set of features associated with the second image; and input the set of features associated with the second image to a second trained ML model but not the first trained ML model to generate an output indicating an authenticity of an object associated with the second image, a second ML model trained using the plurality of sets of features associated with the second plurality of images to generate the second trained ML model.

14. The method of claim 13, wherein the first trained ML model is a one class support vector machine (SVM) and the performing the feature extraction based on the predetermined portion of the first image and not remaining portions of the first image includes performing feature extraction via histogram of oriented gradients (HOG).

15. The method of claim 13, further comprising:

confirming, before at least one of (1) the performing the feature extraction based on the predetermined portion of the first image and not remaining portions of the first image or (2) the inputting the set of features associated with the first image to the first trained ML model, that a quality associated with the first image is within a predetermined acceptable quality range, the predetermined acceptable quality range determined based on the first trained ML model.

16. The method of claim 13, further comprising:

identifying the first plurality of images having the first image type from a collection of images having a plurality of image types, the plurality of image types including the first image type and the second image type.

17. The method of claim 13, wherein the first plurality of images includes a non-synthetic image of a card and a synthetic image of a card, the predetermined portion of the non-synthetic image of the card augmented to generate the synthetic image of the card.

18. An apparatus, comprising:

a memory; and a processor operatively coupled to the memory, the processor configured to:

receive a first plurality of images having a first image type, each image from the first plurality of images including a predetermined portion;

for each image from the first plurality of images and to generate a plurality of sets of features associated with the first plurality of images, perform feature extraction based on the predetermined portion of that image and not remaining portions of that image to generate a set of features associated with that image;

receive a first image (1) not included in the first plurality of images, (2) that is the first image type, and (3) that has the predetermined portion;

perform feature extraction based on the predetermined portion of the first image and not remaining portions of the first image to generate a set of features associated with the first image;

input the set of features associated with the first image to a first trained machine learning (ML) model to generate an output indicating a status associated with the first image, a first ML model trained using the plurality of sets of features associated with the first plurality of images to generate the first trained ML model receive a second plurality of images having a second image type, each image from the second plurality of images including the predetermined portion;

for each image from the first plurality of images and to generate a plurality of sets of features associated with the second plurality of images, perform feature extraction based on the predetermined portion of that image and not remaining portions of that image to generate a set of features associated with that image;

receive a second image (1) not included in the second plurality of images, (2) that is the second image type, and (3) that has the predetermined portion;

perform feature extraction based on the predetermined portion of the second image and not remaining portions of the second image to generate a set of features associated with the second image; and input the set of features associated with the second image to a second trained ML model and not the first trained ML model to generate an output indicating a status associated with the second image, a second ML model trained using the plurality of sets of features associated with the second plurality of images to generate the second trained ML model.

* * * * *